United States Patent
Vijayan et al.

(10) Patent No.: US 12,414,577 B2
(45) Date of Patent: Sep. 16, 2025

(54) CONVERTIBLE ICE MAKER APPLIANCE FOR MAKING INFUSED ICE OR WATER ICE

(71) Applicant: Haier US Appliance Solutions, Inc., Wilmington, DE (US)

(72) Inventors: Vineeth Vijayan, Louisville, KY (US); Stephanos Kyriacou, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 116 days.

(21) Appl. No.: 18/533,822

(22) Filed: Dec. 8, 2023

(65) Prior Publication Data
US 2025/0185686 A1     Jun. 12, 2025

(51) Int. Cl.
*A23G 9/08*     (2006.01)
*F25C 1/04*     (2018.01)
*F25C 5/02*     (2006.01)

(52) U.S. Cl.
CPC ........... *A23G 9/083* (2013.01); *F25C 1/04* (2013.01); *F25C 5/02* (2013.01); *F25C 2301/00* (2013.01); *F25C 2305/0221* (2021.08); *F25C 2400/10* (2013.01); *F25C 2600/02* (2013.01); *F25C 2600/04* (2013.01)

(58) Field of Classification Search
CPC ... A23G 9/083; F25C 1/04; F25C 5/02; F25C 2301/00; F25C 2305/0221; F25C 2400/10; F25C 2600/02; F25C 2600/04
See application file for complete search history.

(56) References Cited

U.S. PATENT DOCUMENTS

| | | |
|---|---|---|
| 2,237,525 A | 4/1941 | Nolan |
| 6,513,337 B1 | 2/2003 | Astvatsatrian et al. |
| 6,672,097 B1 | 1/2004 | Ashley |
| 8,794,126 B2 | 8/2014 | Skalski et al. |
| 9,038,410 B2 | 5/2015 | Erbs et al. |
| 9,066,529 B2 | 6/2015 | Fassberg et al. |
| 9,759,470 B2 | 9/2017 | Zisholtz et al. |
| 10,378,806 B2 | 8/2019 | Boarman et al. |
| 2009/0120306 A1 | 5/2009 | DeCarlo et al. |

(Continued)

FOREIGN PATENT DOCUMENTS

| | | | |
|---|---|---|---|
| CN | 102313417 A | * | 1/2012 |
| CN | 101871711 B | | 8/2012 |

(Continued)

*Primary Examiner* — Emmanuel E Duke
(74) *Attorney, Agent, or Firm* — Dority & Manning, P.A.

(57) ABSTRACT

A method of operating an ice maker appliance includes determining an infused ice making mode of the ice maker appliance. The method also includes flowing a volume of liquid water through the pod in the pod receiver, whereby the additive mixes with the volume of liquid water. The volume of liquid water may be a predetermined volume of liquid water based on the infused ice making mode. The method further includes flowing the additive and the volume of liquid water into the mold cavity and retaining the additive and the volume of liquid water in the mold cavity to form an ice piece from the additive and the volume of liquid water. The method may also include operating the ice maker appliance to provide a predetermined temperature based on the infused ice making mode.

19 Claims, 24 Drawing Sheets

(56) References Cited

U.S. PATENT DOCUMENTS

| | | | | |
|---|---|---|---|---|
| 2011/0076375 A1* | 3/2011 | Johnson | ............... | F25C 1/04 |
| | | | | 62/344 |
| 2016/0205988 A1 | 7/2016 | Bird et al. | | |
| 2016/0216020 A1 | 7/2016 | Safrin | | |
| 2017/0042181 A1 | 2/2017 | Fiaschi | | |
| 2019/0193928 A1* | 6/2019 | Broen | ............... | B65D 65/463 |

FOREIGN PATENT DOCUMENTS

| | | | | |
|---|---|---|---|---|
| CN | 102297551 B | 4/2013 | | |
| DE | 20218085 U1 | 2/2003 | | |
| JP | H0745827 Y2 * | 10/1995 | | |
| WO | WO-2018222677 A1 * | 12/2018 | ............. | A23F 5/243 |

* cited by examiner

CONVERTIBLE ICE MAKER APPLIANCE FOR MAKING INFUSED ICE OR WATER ICE

FIELD OF THE INVENTION

The present subject matter relates generally to ice maker appliances, and in particular to ice maker appliances configured to selectively produce water ice or infused ice from water and an additive such as a flavorant.

BACKGROUND OF THE INVENTION

Certain refrigerator appliances include an ice maker. An ice maker appliance may also be a stand-alone appliance designed for use in commercial and/or residential settings. To produce ice, liquid water is directed to the ice maker and frozen. For example, certain ice makers include a mold body for receiving liquid water. In some systems, a working fluid is used to directly cool the mold body, e.g., by conductive heat transfer. In other systems, the air around the mold body may be cooled such that the mold body is indirectly cooled via the air. When the mold body is cooled, directly and/or indirectly, ice may be formed from the liquid water therein. After ice is formed in the mold body, it may be harvested from the mold body and stored within an ice bin or bucket within the refrigerator appliance.

Conventional ice maker appliances are configured for producing ice pieces solely from water, e.g., tap water or other similar water sources. Thus, the resulting ice from such ice maker appliances may be perceived as bland and generally provides little to no flavor or nutrients. Although such plain water ice may be desired in many use cases, the option to also produce infused ice is desired, at least some of the time. Thus, a second and additional ice maker may be included which is dedicated to producing infused ice when such ice is desired. However, such configuration may result in excessive redundant systems and reduced available storage space within the overall appliance, e.g., for food items or stored ice pieces.

Accordingly, a single ice maker with features for selectively producing plain ice from water only or infused ice from water and an additive (such as a flavorant, electrolytes, vitamins, and/or other similar additives) would be desirable.

BRIEF DESCRIPTION OF THE INVENTION

Aspects and advantages of the invention will be set forth in part in the following description, or may be apparent from the description, or may be learned through practice of the invention.

According to an exemplary embodiment, a method of operating an ice maker appliance is provided. The ice maker appliance includes a mold body having a mold cavity and a pod receiver upstream of the mold cavity along a flow path of the liquid water. The mold cavity is configured for receiving liquid water therein and retaining the liquid water to form an ice piece in the mold cavity. The pod receiver is configured to hold a pod containing an additive. The method includes determining an infused ice making mode of the ice maker appliance. The infused ice making mode includes forming an infused ice piece from the liquid water and the additive. The method also includes flowing a predetermined volume of liquid water through the pod in the pod receiver, which causes the additive to mix with the predetermined volume of liquid water. The predetermined volume of liquid water is based on the infused ice making mode. The method further includes flowing the additive and the predetermined volume of liquid water into the mold cavity and retaining the additive and the predetermined volume of liquid water in the mold cavity to form an infused ice piece from the additive and the volume of liquid water.

According to another exemplary embodiment, a method of operating an ice maker appliance is provided. The ice maker appliance includes a mold body having a mold cavity and a pod receiver upstream of the mold cavity along a flow path of the liquid water. The mold cavity is configured for receiving liquid water therein and retaining the liquid water to form an ice piece in the mold cavity. The pod receiver is configured to hold a pod containing an additive. The method includes determining an infused ice making mode of the ice maker appliance. The infused ice making mode includes forming an infused ice piece from the liquid water and the additive. The method also includes flowing a volume of liquid water through the pod in the pod receiver, which causes the additive to mix with the volume of liquid water. The method further includes flowing the additive and the volume of liquid water into the mold cavity and retaining the additive and the volume of liquid water in the mold cavity to form an infused ice piece from the additive and the volume of liquid water. The method also includes operating the ice maker appliance to provide a predetermined temperature at the mold body while retaining the additive and the volume of liquid water in the mold cavity to form the infused ice piece from the additive and the volume of liquid water. The predetermined temperature at the mold body is based on the infused ice making mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
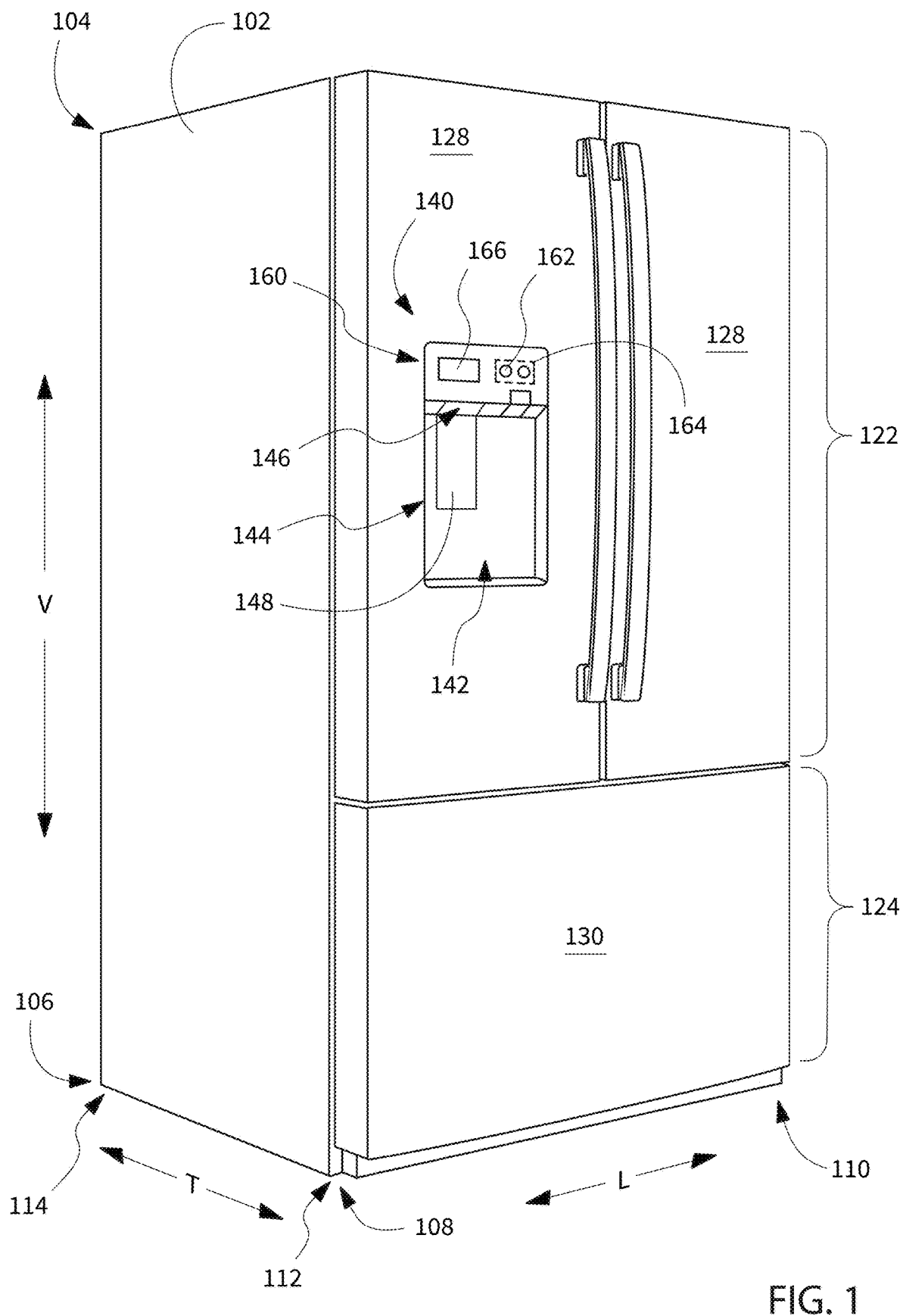
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise. As used herein, the terms "first," "second," and "third" may be used interchangeably to distinguish one component from another and are not intended to signify location or importance of the individual components.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Consequently, the description set forth herein is for illustrative purposes only and is not intended to be limiting in any aspect to any particular refrigerator chamber configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
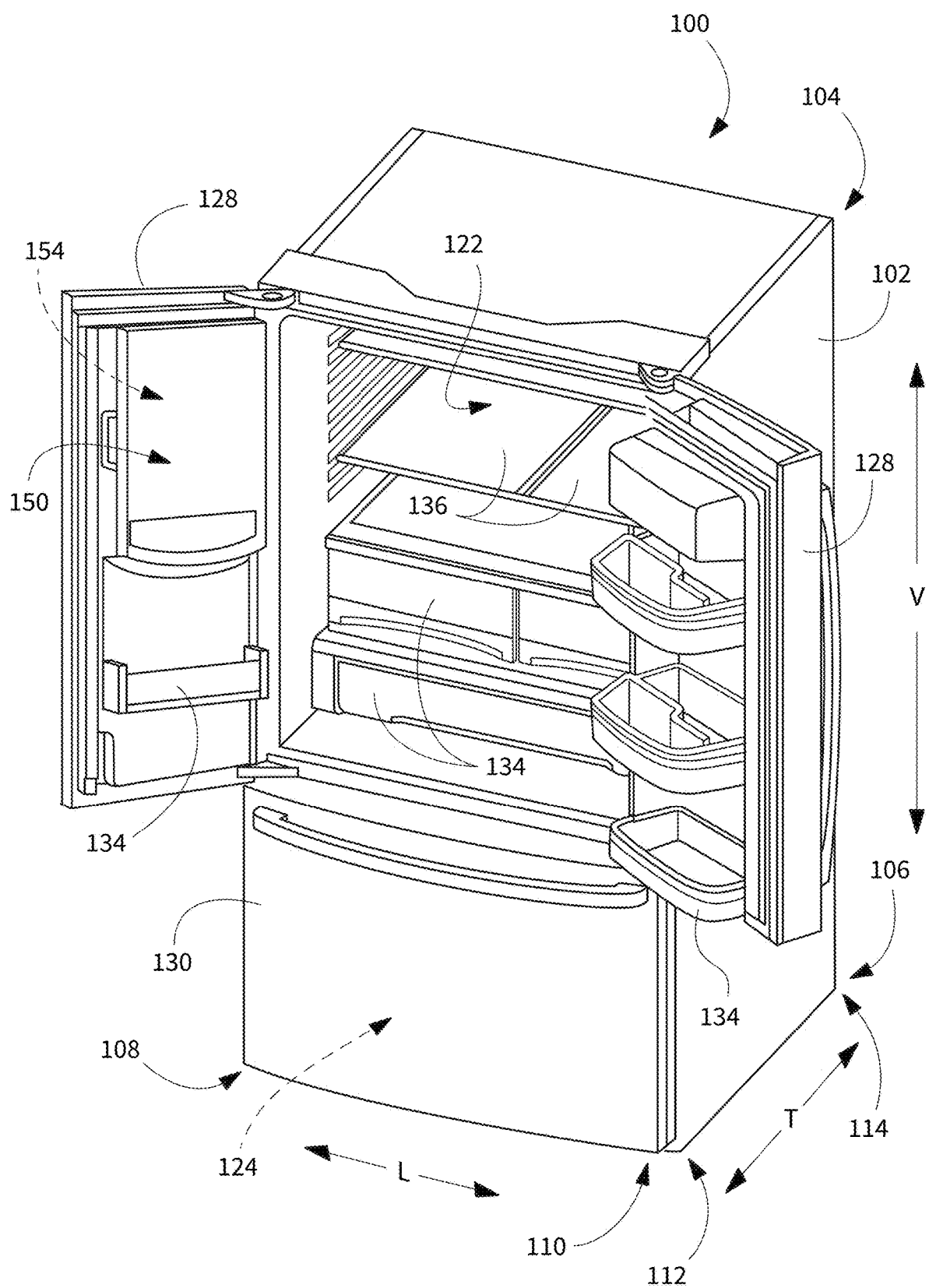
FIG. 2 provides a perspective view of the exemplary refrigerator appliance of FIG. 1, with the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items, etc.) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring now generally to FIG. 1, a dispensing assembly 140 will be described according to exemplary embodiments of the present subject matter. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 may include a sensor (such as an ultrasonic sensor) or a button rather than the paddle. Discharging outlet 146 and actuating mechanism 148 are an external part of ice dispenser 144 and are mounted in dispenser recess 142.

By contrast, inside refrigerator appliance 100, refrigerator door 128 may define an icebox 150 (FIGS. 2 through 4) housing an ice making assembly which includes an ice maker 200 and an ice storage bin 202 that are configured to supply ice to dispenser recess 142. In this regard, for example, icebox 150 may define an ice making chamber 154 for housing an ice making assembly, a storage mechanism, and a dispensing mechanism.

A control panel 160 is provided for controlling the mode of operation. For example, control panel 160 includes one or more selector inputs 162, such as knobs, buttons, touchscreen interfaces, etc., such as a water dispensing button and an ice-dispensing button, for selecting a desired mode of operation such as crushed or non-crushed ice. In addition, inputs 162 may be used to specify a fill volume or method of operating dispensing assembly 140. In this regard, inputs 162 may be in communication with a processing device or controller 164. Signals generated in controller 164 operate refrigerator appliance 100 and dispensing assembly 140 in response to selector inputs 162. Additionally, a display 166, such as an indicator light or a screen, may be provided on control panel 160. Display 166 may be in communication with controller 164, and may display information in response to signals from controller 164.

As used herein, "processing device" or "controller" may refer to one or more microprocessors or semiconductor devices and is not restricted necessarily to a single element. The processing device can be programmed to operate refrigerator appliance 100 and dispensing assembly 140. The processing device may include, or be associated with, one or more memory elements (e.g., non-transitory storage media). In some such embodiments, the memory elements include electrically erasable, programmable read only memory (EEPROM). Generally, the memory elements can store information accessible to the processing device, including instructions that can be executed by processing device. Optionally, the instructions can be software or any set of instructions and/or data that when executed by the processing device, cause the processing device to perform operations. For example, the instructions may include a software package configured to operate the system to, e.g., execute the exemplary methods described below. In exemplary embodiments, the various method steps as disclosed herein may be performed, e.g., in whole or part, by controller 164 and/or another, separate, dedicated controller.

Figure 3:
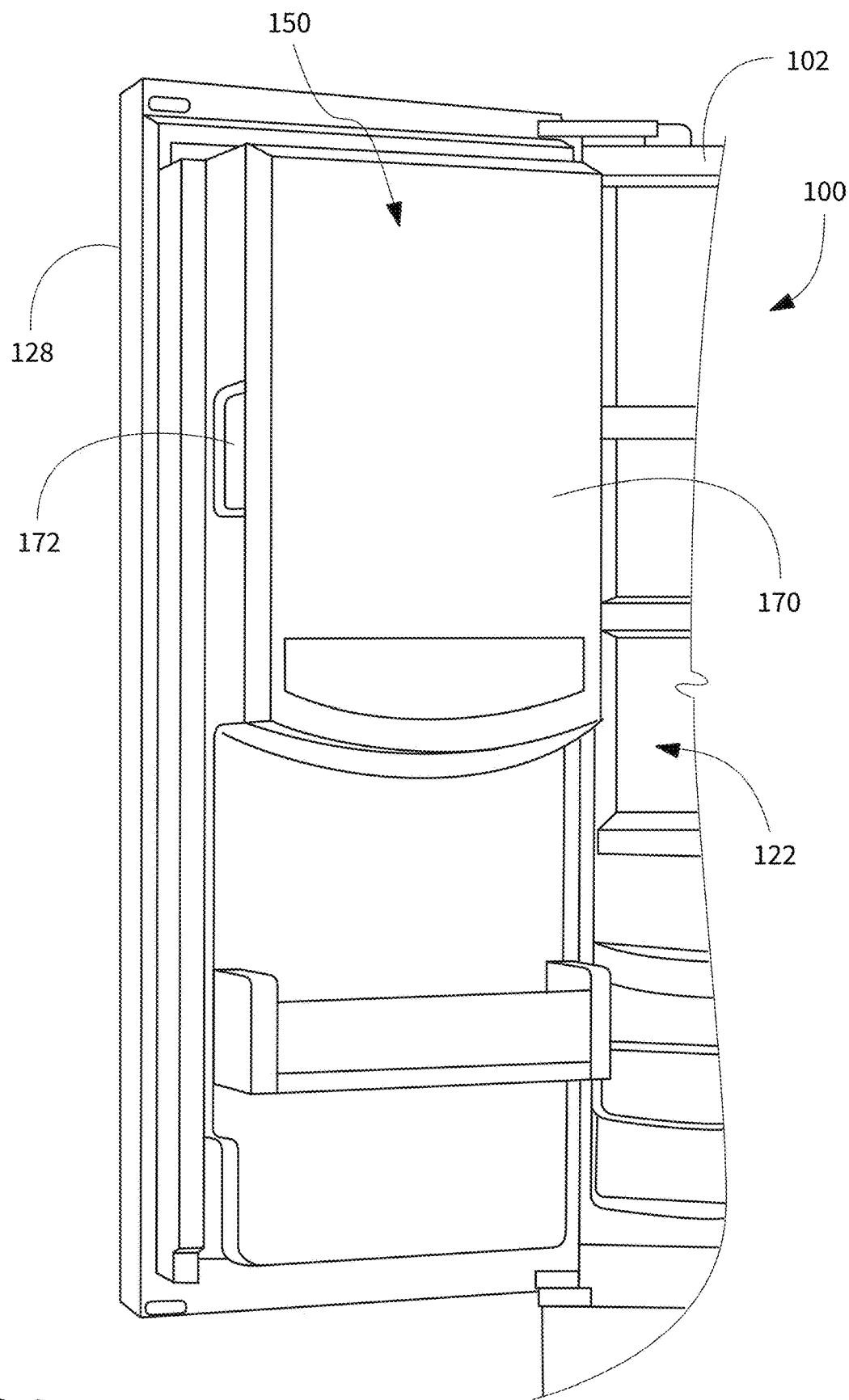
FIG. 3 provides an interior perspective view of a dispenser door of the exemplary refrigerator appliance of FIG. 1.
Figure 4:
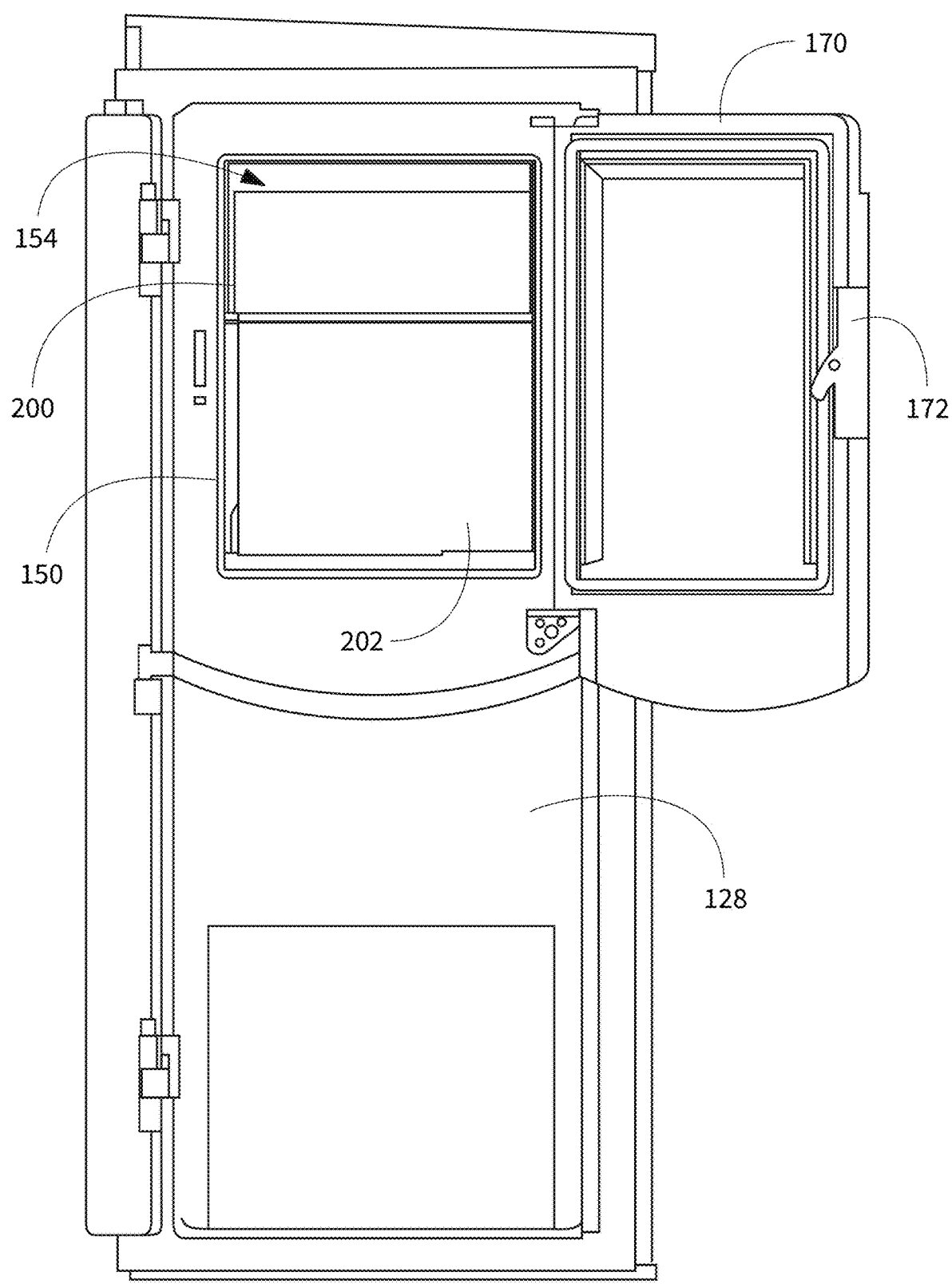
FIG. 4 provides an interior elevation view of the door of FIG. 3 with an access door of the door shown in an open position.

Referring now to FIGS. 3 and 4, FIG. 3 provides an interior perspective view of one of the refrigerator doors 128 and FIG. 4 provides an interior elevation view of the door 128 with an access door 170 shown in an open position. Refrigerator appliance 100 includes a sub-compartment 150 defined on refrigerator door 128. As mentioned above, the sub-compartment 150 may be referred to as an "icebox." In the illustrated exemplary embodiment, icebox 150 extends into fresh food chamber 122 when refrigerator door 128 is in the closed position. As shown in FIG. 4, the ice maker 200 may be positioned within the icebox 150. The ice maker 200 is generally configured for freezing the water to form ice, e.g., ice pieces 500 (see, e.g., FIG. 6) such as ice cubes, which may optionally be stored in storage bin 202 and dispensed through discharging outlet 146 by dispensing assembly 140. For example, the ice maker 200 may include one or more mold cavities 226 (see, e.g., FIG. 14) defined therein, such as in a mold body 220 thereof, and liquid water may be directed into the mold cavity (or cavities) 226 of the ice maker 200 and the water may then be retained therein at a temperature at or below the freezing point of water to form an ice piece or ice pieces. FIG. 4 illustrates the ice maker 200 with an ice storage bin 202 positioned below the ice maker 200 for receiving ice pieces from the ice maker 200, e.g., for receiving the ice after the ice is ejected from the ice maker 200. As those of ordinary skill in the art will recognize, ice from the ice maker 200 may be collected and stored in the ice storage bin 202 and supplied to dispenser 144 (FIG. 1) from the ice storage bin 202 in icebox 150 on a back side of refrigerator door 128. In additional embodiments, ice from the ice maker 200 may be configured for manual harvest as well as or instead of supplied to the dispenser 144. Chilled air from a sealed system (not shown) of refrigerator appliance 100 may be directed into or onto components within the icebox 150, e.g., ice maker 200 and/or ice storage bin 202.

As mentioned above, the present disclosure may also be applied to other types and styles of refrigerator appliances such as, e.g., a top mount refrigerator appliance, a side-by-side style refrigerator appliance or a standalone ice maker appliance. Variations and modifications may be made to ice making assembly while remaining within the scope of the present subject matter. Accordingly, the description herein of the icebox 150 on the door 128 of the fresh food chamber 122 is by way of example only. In other example embodiments, the ice making assembly may be positioned in the freezer chamber 124, e.g., of the illustrated bottom-mount refrigerator, of a side by side refrigerator, of a top-mount refrigerator, or any other suitable refrigerator appliance. As another example, the ice making assembly may also be provided in a standalone ice maker appliance. As used herein, the term "standalone ice maker appliance" refers to an appliance of which the sole or primary operation is generating or producing ice, e.g., without any additional or other chilled chambers other than the icebox, whereas the more general term "ice maker appliance" includes such appliances as well as appliances with diverse capabilities in addition to making ice, such as a refrigerator appliance equipped with an ice maker, among other possible examples.

As mentioned above, an access door 170 may be hinged to the inside of the refrigerator door 128. Access door 170 permits selective access to icebox 150. Any manner of suitable latch 172 may be configured with icebox 150 to maintain access door 170 in a closed position. As an example, latch 172 may be actuated by a consumer in order to open access door 170 for providing access into icebox 150. Access door 170 can also assist with insulating icebox 150, e.g., by thermally isolating or insulating icebox 150 from fresh food chamber 122.

Figure 5:
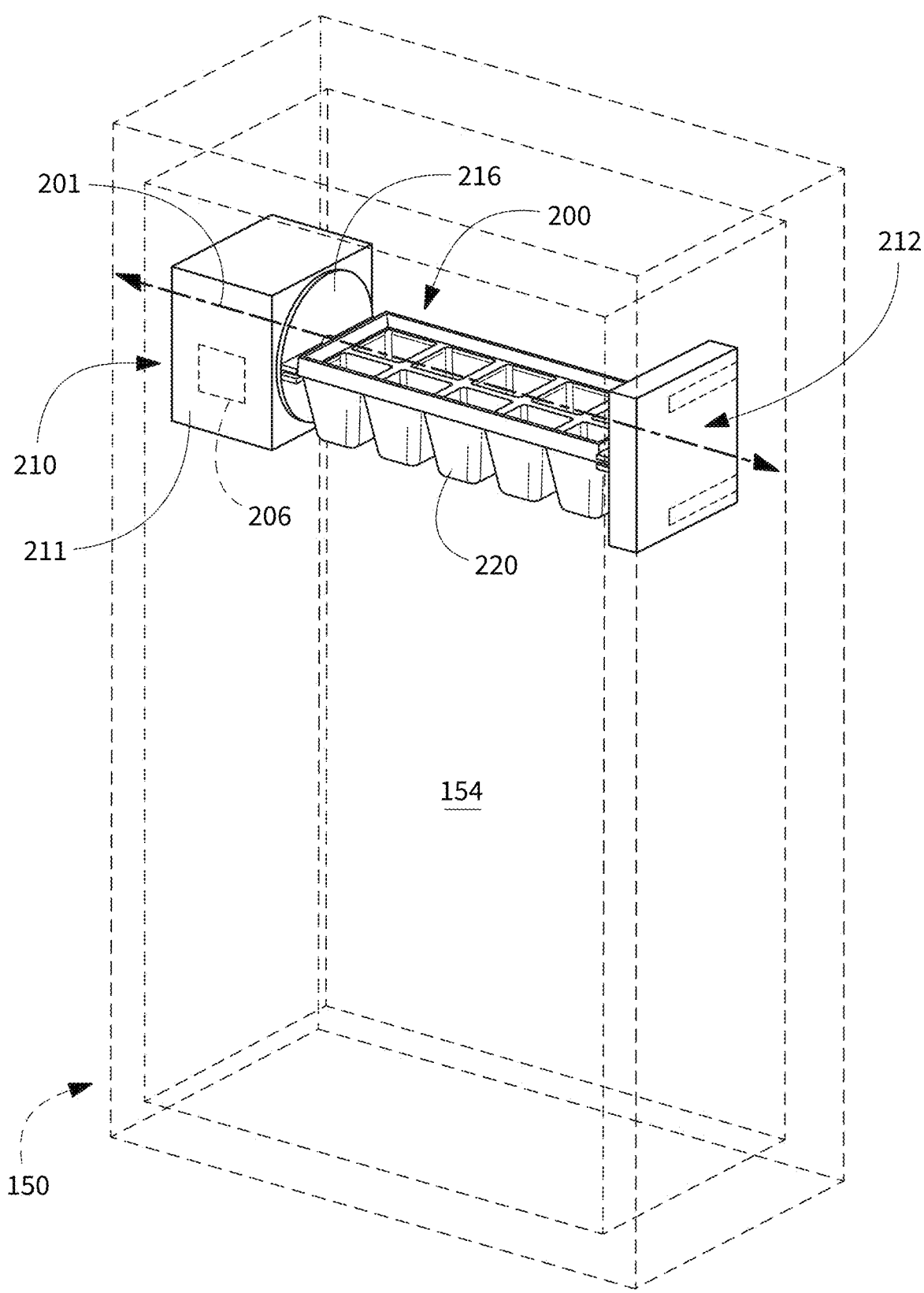
FIG. 5 provides a perspective view of an exemplary ice maker disposed in an icebox in accordance with one or more embodiments of the present disclosure.

Referring now to FIG. 5, a perspective views of an exemplary embodiment of the ice maker 200 is illustrated. In some embodiments, e.g., as illustrated in FIG. 5, the ice maker 200 may be a twist tray ice maker. In such embodiments, the ice maker 200 may include a mount unit 210 positioned in the icebox 150, e.g., mounted on one or more internal surfaces of the icebox 150. The mount unit 210 may be coupled to an ice tray, e.g., the mount unit 210 may be configured to releasably receive the ice tray. The ice tray is an exemplary embodiment of a mold body 220 of the ice maker 200, e.g., the ice tray may include one or more compartments 224 (see, e.g., FIG. 6) which define mold cavities 226 (see, e.g., FIG. 14) for receiving liquid water therein, and the liquid water may be retained within the compartment(s) 224 until ice is formed (or at least a portion of the liquid water may be retained). The ice tray may comprise a flexible, e.g., twistable, material, such as the ice tray may comprise a plastic material which is sufficiently flexible to twist the ice tray in order to promote disengagement, e.g., release, of ice pieces in the ice tray, such release of the ice pieces from within the mold cavities 226 of the mold body 220 (i.e., tray in the example embodiment illustrated in FIG. 5), as is understood by those of ordinary skill in the art.

In some embodiments, the mount unit 210 may include a first mount unit 211 and a second mount unit 212. The first and second mount units 211, 212 may be spaced apart from one another along a central axis 201 of the ice maker 200. In various embodiments, a direction of the central axis 201 corresponds to, e.g., is along or parallel to, a longitudinal axis of the ice tray when the ice tray is installed to the mount unit 210.

In various embodiments, the mount unit 210 includes a rotor 216 configured to rotate relative to a central axis 201, e.g., on the first mount unit 211. The first mount unit 211 may be fixed to the icebox 150. The first mount unit 211 may include a motor or other actuation device 206 operably coupled to the rotor 216 to rotate relative to the central axis 201, e.g., about the central axis 201. When the ice tray is installed onto the rotor 216, rotation of the rotor 216, such as by the actuation device 206, causes the ice tray to dump or deposit ice or other contents from the ice tray.

In some embodiments, the ice maker 200 may include a dedicated controller, e.g., similar to the controller 164 of the refrigerator appliance 100 which is described above. In embodiments where the ice maker 200 is incorporated into a refrigerator appliance such as the exemplary refrigerator appliance 100 described hereinabove, the dedicated controller may be in addition to the controller 164 of the refrigerator appliance and may be in communication with the controller 164 of the refrigerator appliance 100, and the controller of the ice maker 200 may be in operative communication with other components of the ice maker 200 and may be configured specifically for controlling or directing operation of such components, e.g., the actuation device 206. For example, the dedicated controller, if included, may be provided in the first mount unit 211, e.g., proximate the actuation device 206.

For example, the dedicated controller of the ice maker 200 or the controller 164 may cause the actuation device 206 to rotate a first amount, e.g., through a first number of degrees about the central axis 201, to twist the tray and thereby promote release of ice pieces from the compartment(s) 224 thereof, such as rotating the first amount in a first direction followed by rotating the same amount, e.g., the first amount, in a second direction opposite the first direction to twist the tray to release ice pieces from the compartment(s) 224. After rotating the first amount, e.g., after twisting the tray, the controller may then cause the actuation device 206 to rotate a second amount, e.g., through a second number of degrees about the central axis 201, greater than the first amount to tip over or invert the tray, allowing the ice pieces to fall, e.g., by gravity, from the tray into the bin 202 (FIG. 4) below the ice maker 200.

Figure 6:
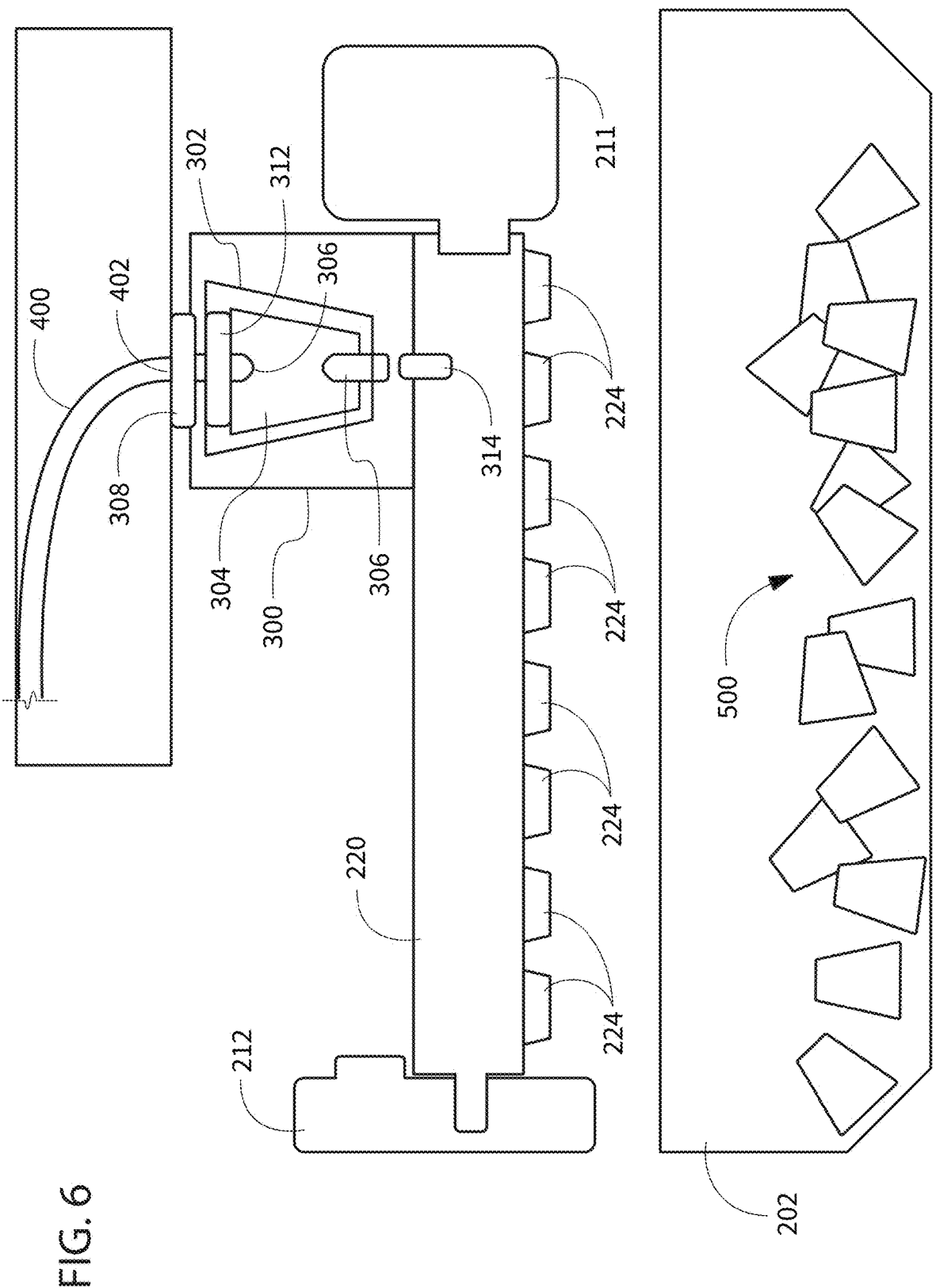
FIG. 6 provides a schematic illustration of an exemplary ice maker in accordance with one or more embodiments of the present disclosure.

Referring now to FIG. 6, the ice maker 200 may further include a pod receiver 300. The pod receiver 300 may be coupled to the mold body 220, and/or may be integrally joined with the mold body 220. The pod receiver 300 may be positioned upstream of the one or more mold cavities 226 along a flow path of the volume of liquid water, such that the liquid water which is to be frozen to form one or more ice pieces therefrom flows through the pod receiver 300 before reaching the mold cavity (or cavities) 226 in the mold body 220. The pod receiver 300 may be coupled to the mold body 220 in various positions, such as at an end of the mold body, e.g., as in the illustrated example embodiments, or in the middle of the body, etc.

The pod receiver 300 may be configured to hold a pod 304 containing an additive, such as the pod receiver may include a pod receiver slot 302 defined therein in which the pod 304 is received. The additive may be provided in any suitable form for mixing with the volume of liquid water as the liquid water flows through the pod receiver 300 and the pod 304 therein. For example, the additive may be a water-soluble powder or may be a liquid, e.g., syrup, or other suitable form, including combinations thereof.

The pod receiver 300 may include one or more elements for opening or puncturing the pod 304. For example, in some embodiments, one or more sharp tubes or hollow needles 306 may be provided in the pod receiver slot 302, and such hollow needles 306 may pierce the pod 304 when the pod 304 is installed in the pod receiver slot 302, such that fluid communication between the interior of the pod 304 (including the additive, e.g., flavorant, therein) and a water supply line 400 upstream of the mold body 220 is provided, whereby liquid water flows from the water supply line 400 through the pod 304 (whereupon the liquid water mixes with the additive) and then flows from the pod 304 to the mold body 220. As diagrammatically depicted in FIG. 6, the water supply line 400 may extend within the refrigerator appliance, such as within a wall or partition of the refrigerator appliance, to an outlet 402 which may engage with the ice maker, e.g., with pod receiver 300 of the ice maker, such as at a first sealing member, e.g., gasket 308, at a water inlet 310 (see, e.g., FIGS. 14 and 17) of the pod receiver 300. A second sealing member, e.g., second gasket 312, may be provided within the pod receiver slot 302 to sealingly engage the pod 304. The pod receiver 300 may be in fluid communication with the mold body 220 by a channel or conduit 314 downstream of the pod receiver slot 302 such that liquid water mixed with additive may flow from the pod 304 to the mold body 220, such as to the mold cavity (or cavities) 226 in the mold body 220. The liquid water mixed with additive may be held in the mold cavity 226 and cooled until the mixture freezes, thereby forming one or more enhanced or infused ice pieces 500, e.g., infused ice pieces 500 comprising both water and the additive.

In some embodiments, the rotor 216 and/or ice storage bin 202 may be omitted, and the ice maker 200 may be configured for manual harvest of the additive ice pieces. For example, as shown in FIGS. 7, 8, 9, and 10, one or both of the mount units 211 and 212 may be movable, e.g., slidable, to disengage the mold body 220 from the mount unit 210, whereby mold body 220 (and, in some embodiments, the pod receiver 300 as well, such as in embodiments where the pod receiver 300 is joined, e.g., integrally joined, to the mold body 220) may be removed from the ice maker appliance, e.g., from refrigerator appliance 100, and the additive ice pieces may be manually harvested. For example, the mold body 220 may be or include a twist tray, whereby the twist tray releases the ice piece when the twist tray is twisted. The twist tray may be manually twisted, e.g., after removing the mold body 220 from the ice maker appliance. As another example, the mold body 220 may include a silicon material. In such embodiments, the mold body 220 may be configured to release the ice piece(s) from mold cavity 226 (or cavities) when the silicon material is flexed, such as manually flexed, e.g., after removing the mold body 220 from the ice maker appliance. Additionally, in some embodiments the rotor 216 (FIG. 5) and actuator 206 (FIG. 5) may be omitted from the first mount unit 211 such that the ice maker is configured for manual harvesting only of the infused ice piece or ice pieces.

Figure 7:
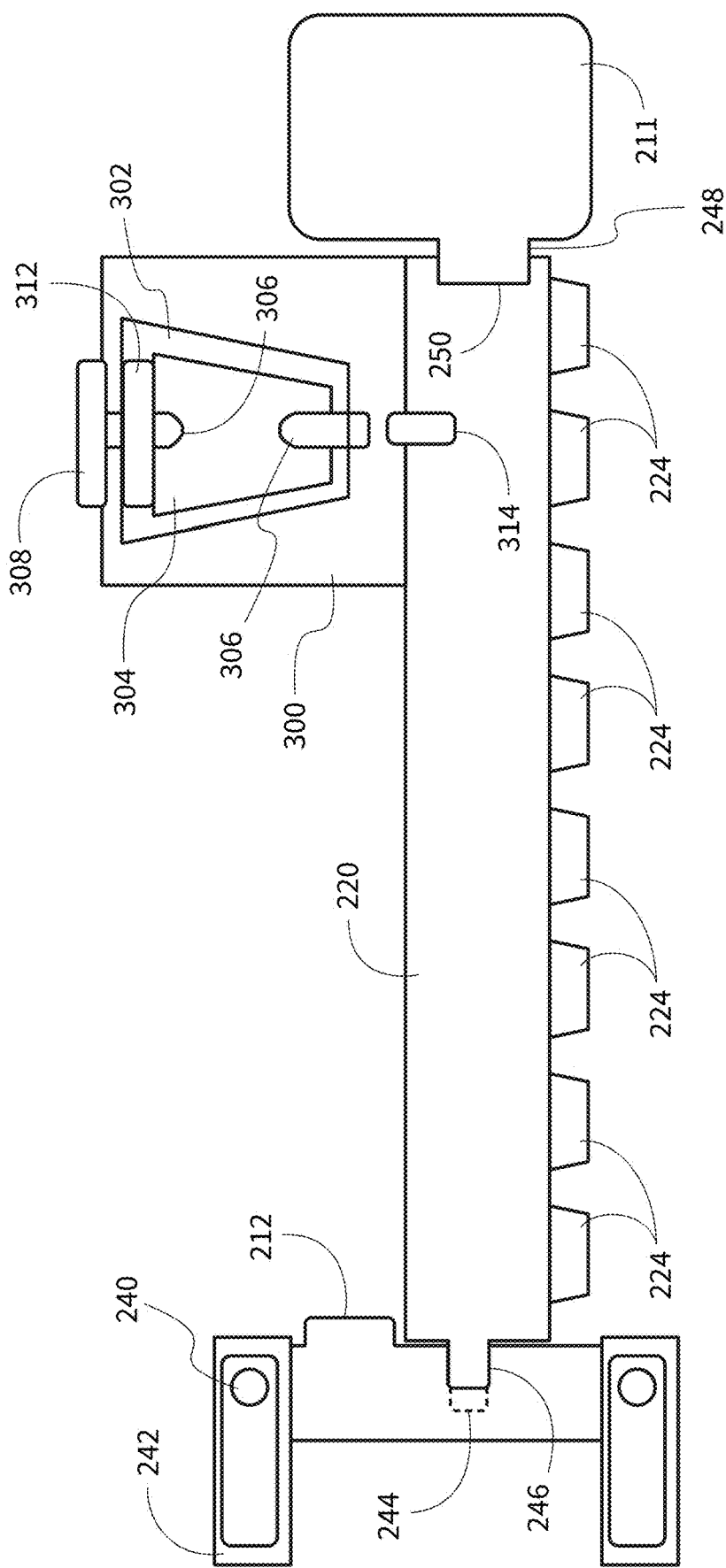
FIG. 7 provides a schematic illustration of an exemplary removable ice maker in accordance with one or more embodiments of the present disclosure.
Figure 8:
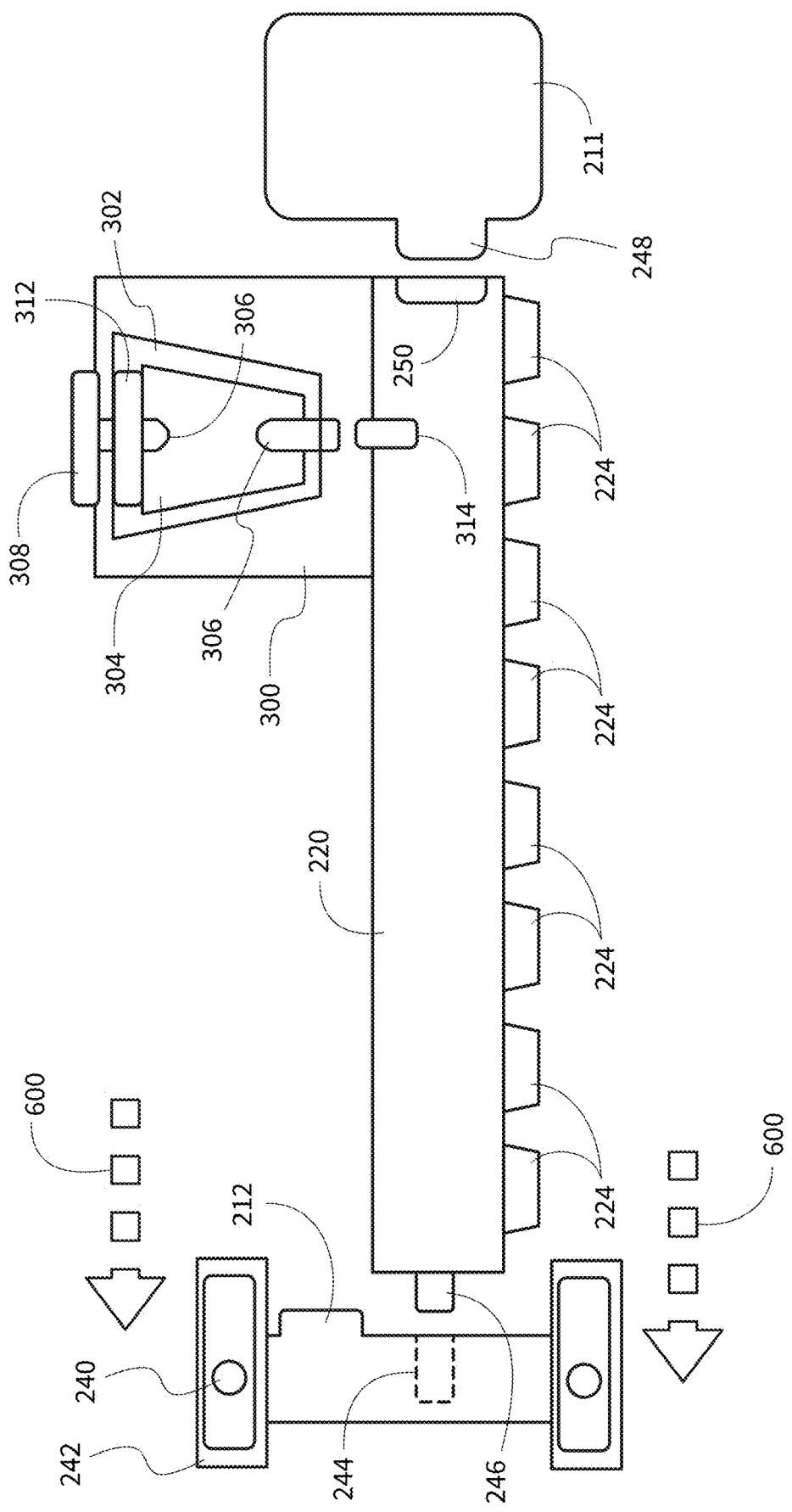
FIG. 8 provides a schematic illustration of the exemplary ice maker of FIG. 7 in a detached position.

In some embodiments, e.g., as illustrated in FIGS. 7 and 8, the second mount 212 may be slidably mounted, e.g., within a wall of the ice maker appliance, e.g., refrigerator appliance 100, such as in a wall of the icebox 150. For example, the second mount unit 212 may be mounted with a slide and lock mechanism, whereby the second mount unit 212 may be locked in place in a connected position (FIG. 7) and may be unlocked to permit sliding the second mount unit 212 away from the mold body 220, thereby permitting the mold body 220 to be removed, e.g., for cleaning the mold body 220 and/or manually harvesting one or more ice pieces 500 therefrom. The slide and lock mechanism may include, for example, a roller 240 within a frame 242, such that the frame 242 constrains movements of the roller 240 and the slide and lock mechanism may further include a lock (not shown) which holds the second mount unit 212 in a forward position (FIG. 7) when the lock is engaged and which permits the second mount unit 212 to slide (e.g., along arrows 600 in FIG. 8) between the forward position and a retracted position (FIG. 8).

The mold body 220 may be releasably mounted to the first mount unit 211 and the second mount unit 212. For example, the mold body 220 may be releasably mounted to the first mount unit 211 by a first tab 248 on one of the mold body 220 and the first mount unit 211 and a first socket 250 in the other of the mold body 220 and the first mount unit 211. Similarly, the mold body 220 may be releasably mounted to the second mount unit 212 by a second tab 246 on one of the mold body 220 and the second mount unit 212 and a second socket 244 in the other of the mold body 220 and the second mount unit 212. As illustrated in FIG. 8, the first socket 250 and the second tab 246 may be provided in and on the mold body 220, however, in additional exemplary embodiments, the positions of either or both tab and socket sets may be reversed, e.g., the first tab 248 may be provided on the mold body 220 and the first socket 250 may be provided in the first mount unit 211.

Figure 9:
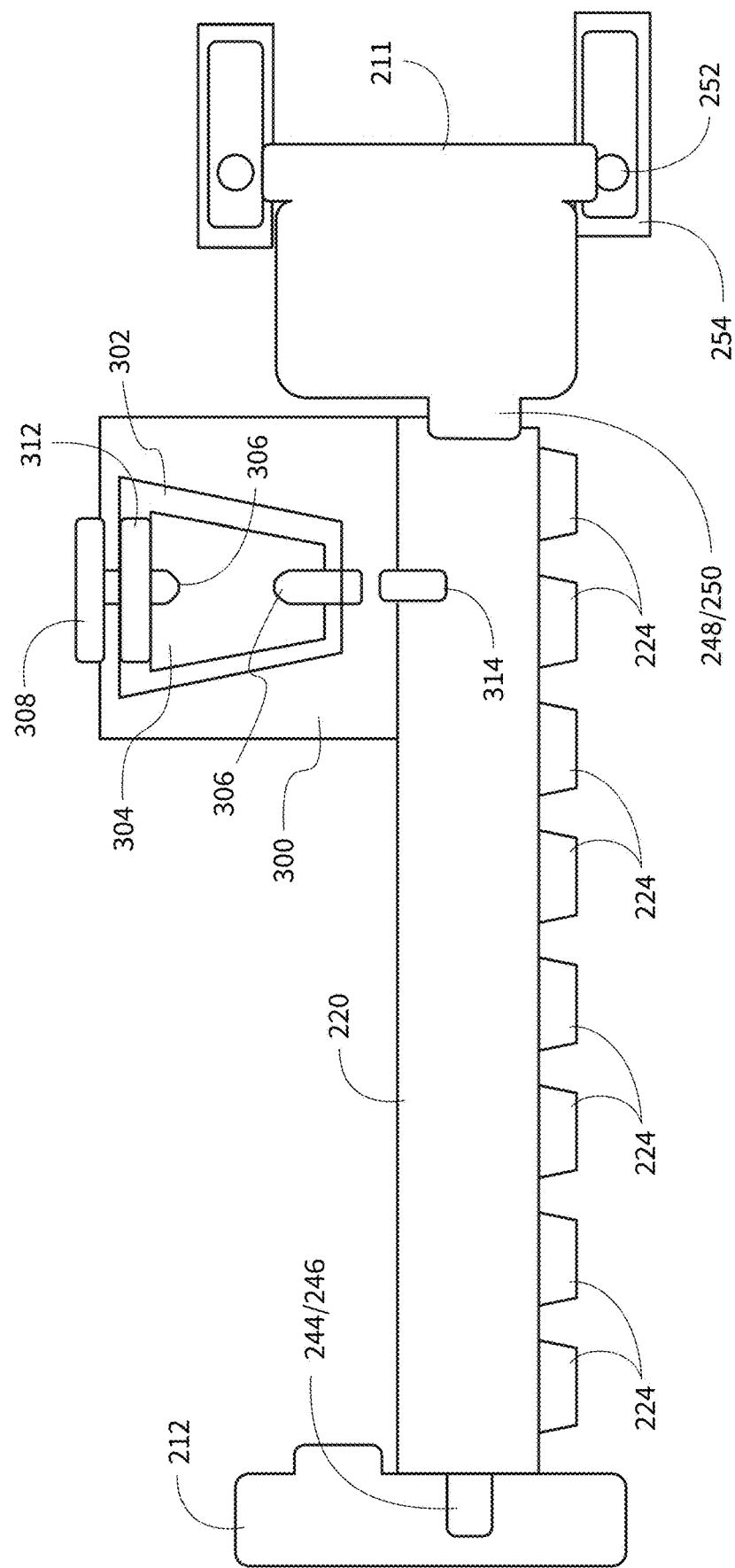
FIG. 9 provides a schematic illustration of an exemplary removable ice maker in accordance with one or more embodiments of the present disclosure.
Figure 10:
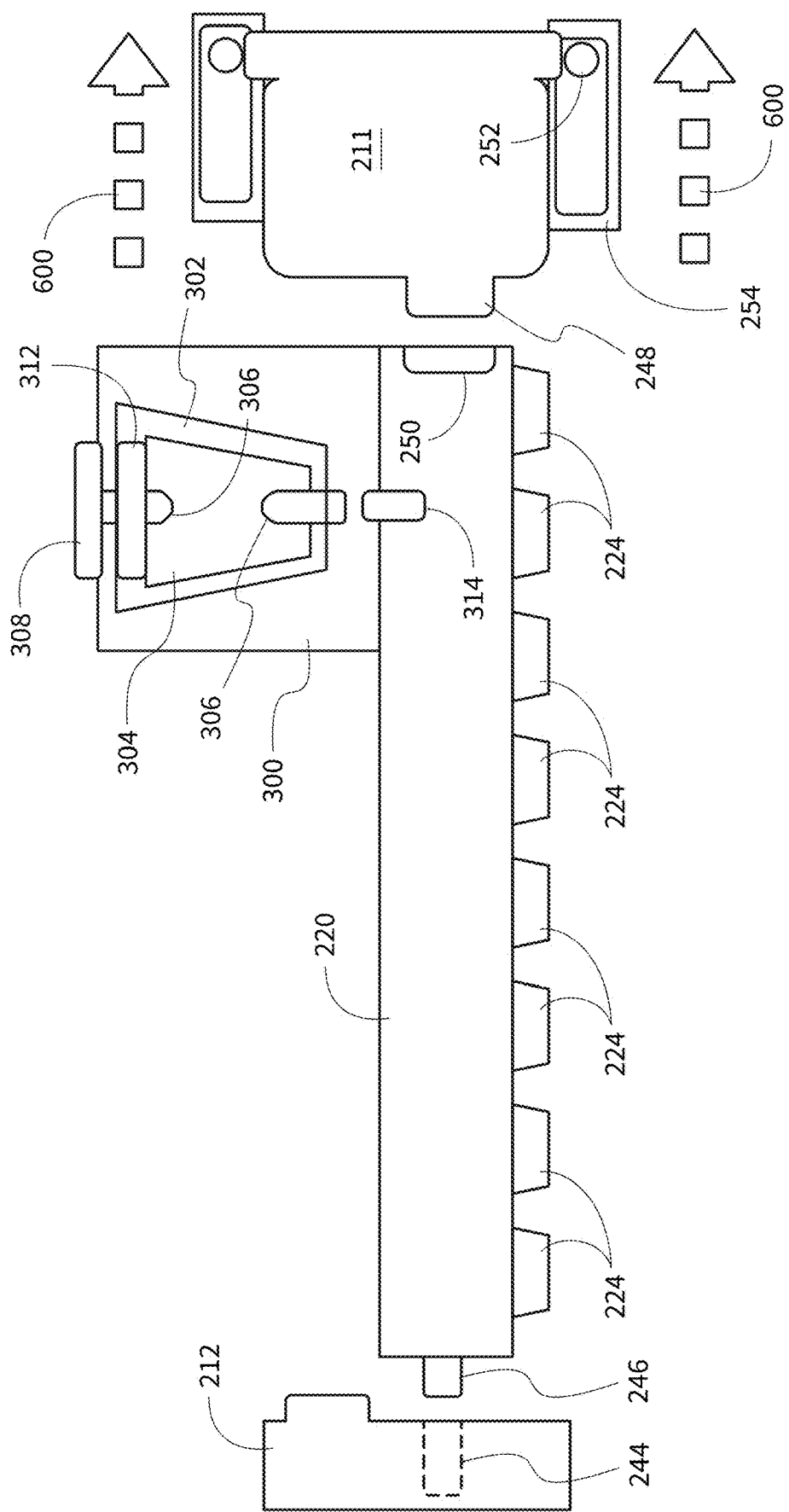
FIG. 10 provides a schematic illustration of the exemplary ice maker of FIG. 9 in a detached position.

As illustrated in FIGS. 9 and 10, in some embodiments, the first mount unit 211 may be slidably mounted as well as or instead of the second mount unit 212. As discussed above, such mounting may permit detachment of the mold body 220 from the first and second mount units 211 and 212 and removal of the mold body 220 from the ice maker appliance, e.g., refrigerator appliance 100, such as for harvesting one or more ice pieces from the mold body 220 and/or cleaning the mold body 220. The first mount unit 211 may be slidable mounted in the wall of the ice maker appliance by a slide and lock mechanism including a roller 252 within a frame 254, similar to the roller 240 and frame 242 described above. As may be seen in FIGS. 9 and 10, the first mount unit 211 may be slidable between a forward position (FIG. 9) and a retracted position (FIG. 10), e.g., as indicated by arrows 600 in FIG. 10.

Figure 11:
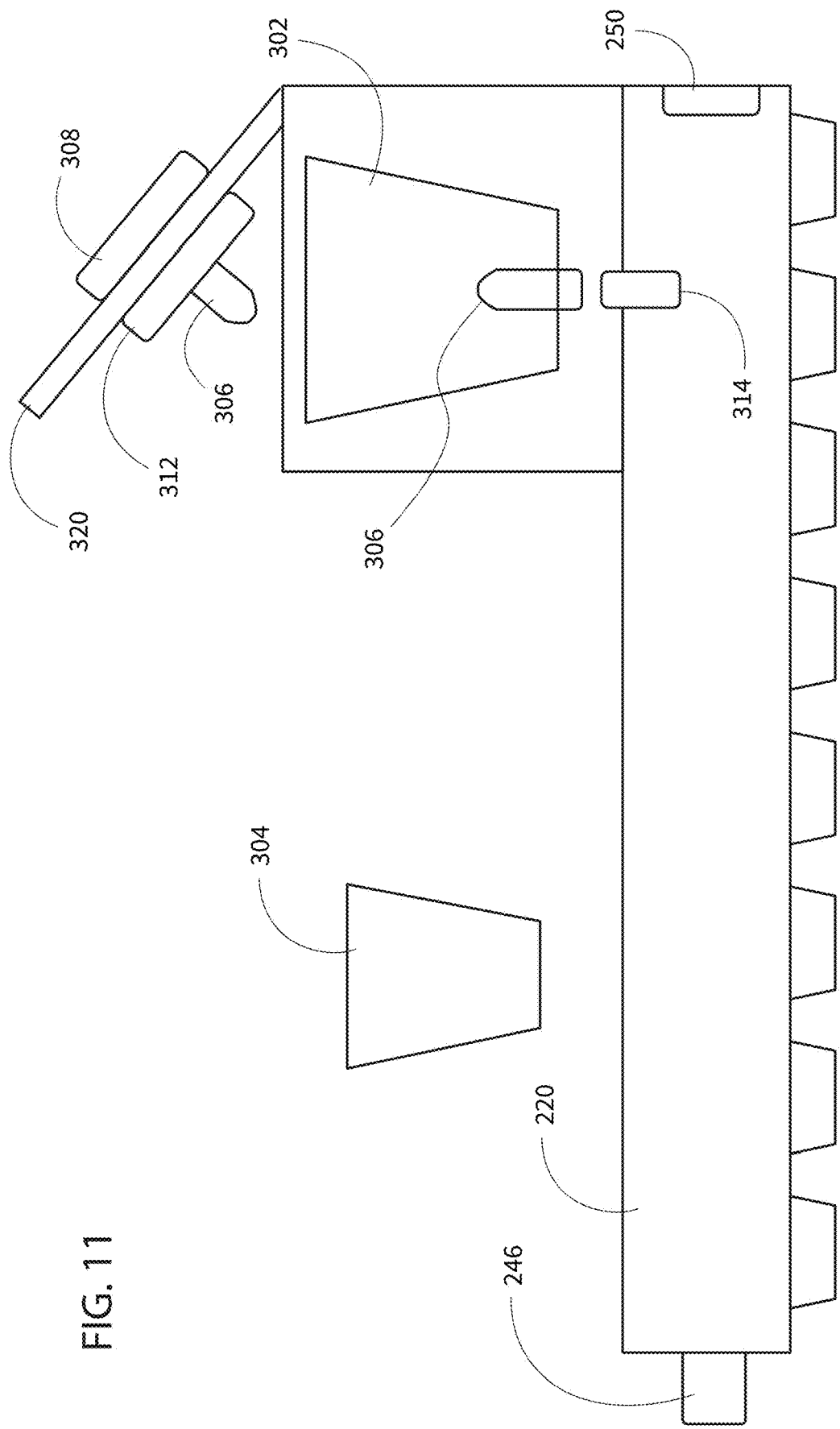
FIG. 11 provides a schematic illustration of an exemplary ice maker in accordance with one or more embodiments of the present disclosure with a door thereof in an open position.

In some embodiments, e.g., as may be seen in FIG. 11, the ice maker 200 may include a door 320 rotatably mounted to the pod receiver 300. In such embodiments, the door 320 may be movable between a closed position (e.g., FIGS. 6-10) wherein the pod receiver slot 302 is enclosed within the pod receiver 300 and an open position (e.g., FIG. 11) which permits access to the pod receiver slot 302 in the pod receiver 300. As illustrated in FIG. 11, one of the hollow needles 306, e.g., an upper one of the hollow needles 306, may be positioned on and extend from (e.g., into the pod receiver slot 302 when the door 320 is in the closed position) an internal surface of the door 320. In such embodiments, the hollow needle 306 on the door 320 may puncture the pod 304, e.g., a top or lid of the pod 304, when the door 320 moves from the open position to the closed position while the pod 304 is received within the slot 302. As may be seen, e.g., in FIG. 17, the water inlet port 310 may be positioned on an external surface of the door 320, e.g., opposite the hollow needle 306 on the internal surface of the door 320. Returning to FIG. 11, the first sealing member, e.g., gasket 308, may be positioned at the external surface of the door 320, such as to promote sealing engagement between the external surface of the door 320 and a portion, e.g., wall, of the ice maker appliance, at and around the water inlet port 310 of the pod receiver 300 and the outlet 402 of the water supply line 400 (see, e.g., FIG. 6). The second sealing member, e.g., second gasket 312, may be provided at the internal surface of the door 320, such as to promote sealing engagement between the internal surface of the door 320 and the top or lid of the pod 304. Thus, for example, liquid water may flow from the water supply line 400 via the outlet 402 and into the pod receiver 300 at the water inlet port 310, and the liquid water may flow into the pod 304 through the hollow needle 306 on the door 320, while the first and second sealing members confine the liquid water within the foregoing path, e.g., the first and second sealing members may prevent or limit liquid water leaking or escaping at the junctions between the pod receiver 300 and the water supply line 400 and between the pod receiver 300 and the pod 304 therein.

Figure 12:
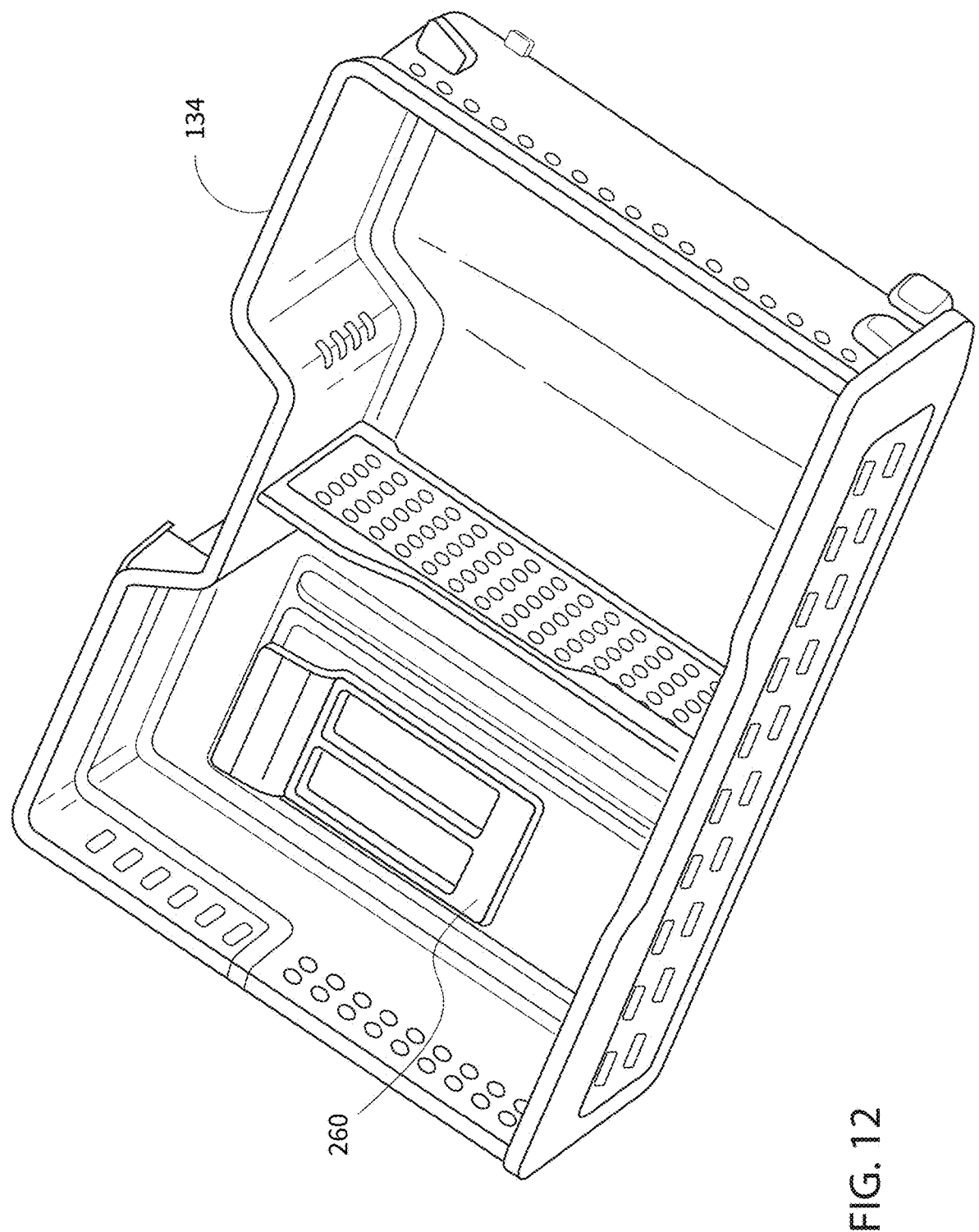
FIG. 12 provides a perspective view of an exemplary component of a refrigerator appliance in which an exemplary removable ice maker in accordance with one or more embodiments of the present disclosure may be received.
Figure 13:
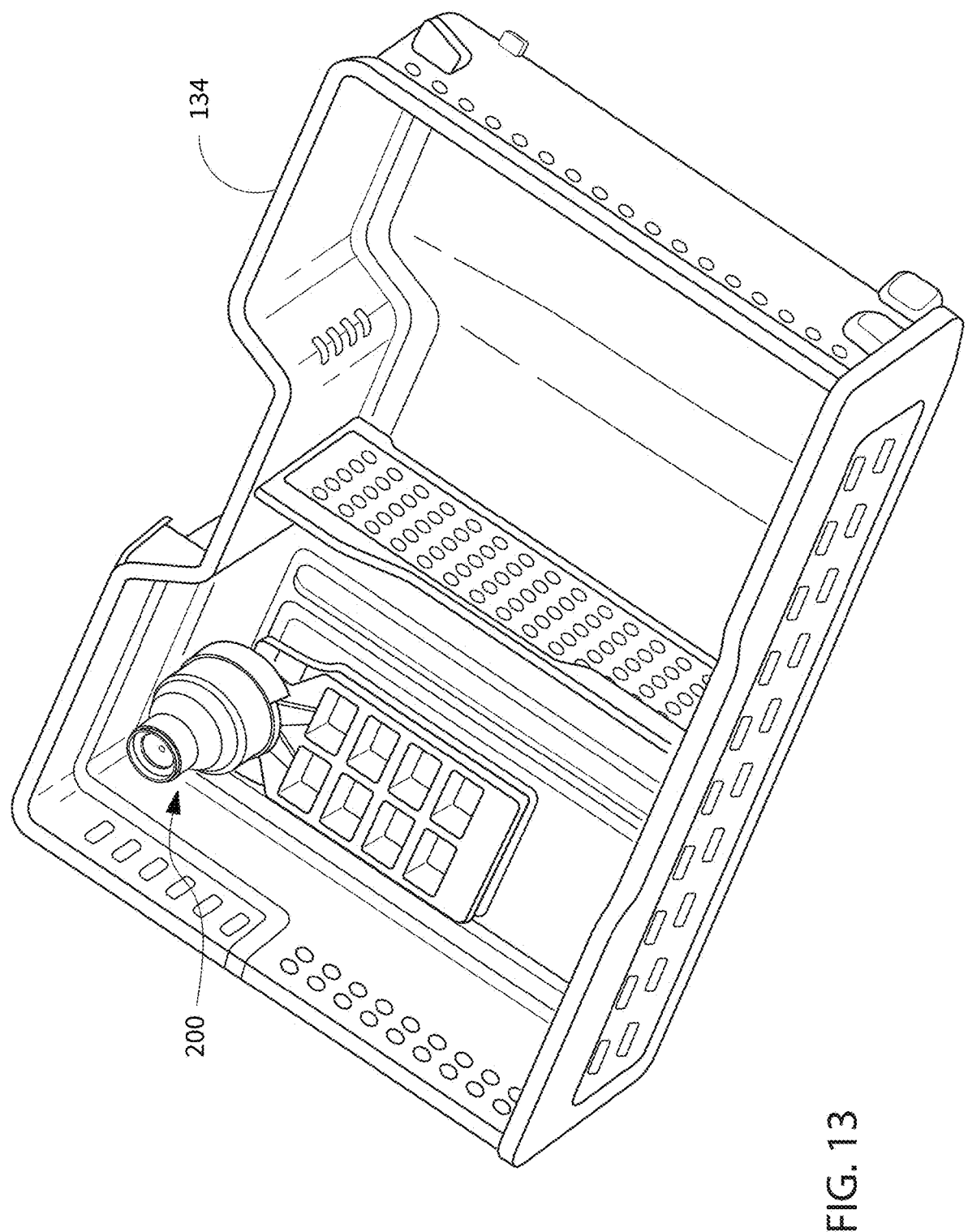
FIG. 13 provides a perspective view of the exemplary component of FIG. 12 with an exemplary ice maker in accordance with one or more embodiments of the present disclosure received therein.

In some embodiments, e.g., where the ice maker appliance is a refrigerator appliance or stand-alone freezer appliance, the ice maker 200 may be removably positioned within a storage component, e.g., a bin or basket such as an internal freezer bin (e.g., which is entirely within the freezer chamber behind the freezer door when in a retracted position), of the refrigerator or freezer. Bin 134 illustrated in FIG. 12 is an example of such storage component. For example, bin 134 may be a freezer bin configured to slidably mount within the freezer compartment 124 of refrigerator appliance 100. Where refrigerator appliance 100 is a bottom-mount configuration, the top of the ice maker 200, when mounted in the freezer bin 134 and with door 130 in a fully closed position and bin 134 in a fully retracted position, may abut a bottom surface of a horizontal partition which extends across the cabinet and thereby separates and defines the fresh food chamber 122 and the freezer chamber 124. Thus, in such exemplary embodiments, the water supply line 400 which provides liquid water to ice maker 200 may be located in the horizontal partition and the outlet 402 of the water supply line 400 may be located at the bottom surface of the horizontal partition. In such embodiments, a base 260 may be provided in the storage element, e.g., bin 134, such as the exemplary base 260 shown in FIG. 12. The ice maker 200 may be removably mountable on the base 260, e.g., as illustrated in FIG. 13. In such embodiments, the base 260 may be positioned and configured to provide consistent and repeatable location of the ice maker 200 within the ice maker appliance, e.g., within the freezer chamber 124 of refrigerator appliance 100, such as to promote alignment of the ice maker 200, e.g., water inlet port 310 thereof, with the water supply line 400 and outlet 402 of the water supply line 400.

In some embodiments, the ice maker appliance, e.g., refrigerator appliance 100, may be configured to detect when the ice maker, e.g., mold body 220 and pod receiver 300, are installed. The ice maker appliance may also be configured to detect the presence of the pod 304 within the pod receiver 300 when the ice maker 200 is installed. Such embodiments may also include detecting whether the ice maker 200 is installed correctly, e.g., is sufficiently aligned with the water supply line to receive the flow of liquid water without liquid water escaping from the ice maker 200. The pod 304 presence may be detected by any suitable sensor, such as a radio frequency identification (RFID) sensor which detects an RFID tag on the pod 304, a Hall effect sensor which responds to magnetic elements of the pod 304 (e.g., a metallic foil component of the pod 304), a weight sensor, or other similar sensor or combination of sensors. In particular, the sensor may not require a line of sight to the pod, such as detecting the pod based on magnetic fields or radio frequency, as mentioned. In additional embodiments, a transparent window may be provided in the pod receiver such that a line of sight sensor may be used, e.g., an infrared (IR) light based sensor or time of flight sensor. For example, the sensor or sensors which detect the pod may be positioned in the horizontal partition and may be oriented downwards to detect the pod 304 in the pod receiver 300 when the ice maker 200 is installed, e.g., on the base 260 in the bin 134.

Figure 14:
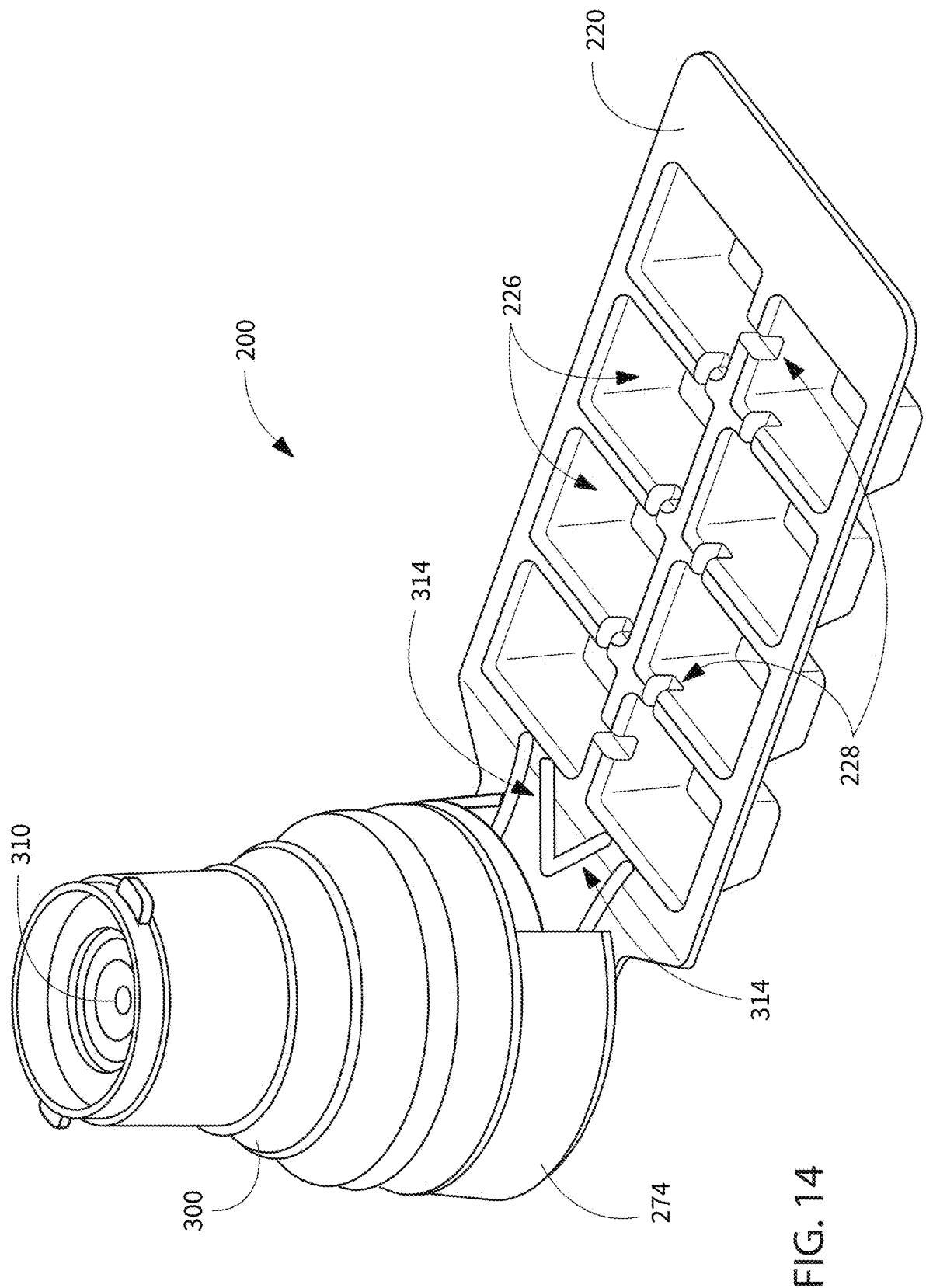
FIG. 14 provides a perspective view of an exemplary pod receiver and an exemplary mold body in accordance with one or more embodiments of the present disclosure, with the pod receiver and mold body coupled together.
Figure 15:
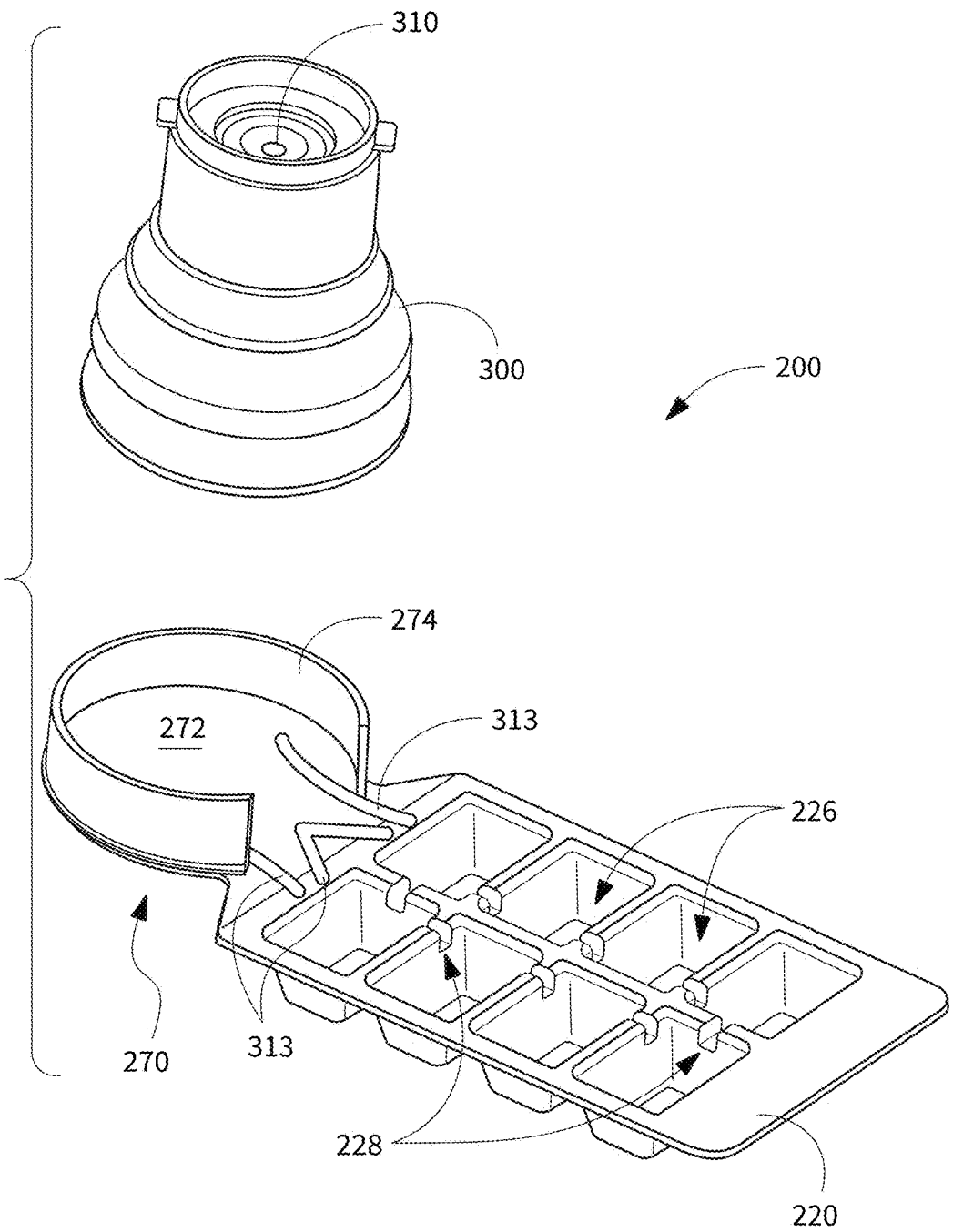
FIG. 15 provides a perspective view of the pod received and mold body of FIG. 14, with the pod receiver and mold body separated from each other.

In some embodiments, the pod receiver 300 may be removable from the mold body 220, e.g., as illustrated in FIGS. 14 and 15. In such embodiments, a receptacle 270 may be formed on the mold body 220, such as at an end of the mold body 220, or in the middle of the mold body 220, or another suitable location. The receptacle 270 may be generally complimentary in shape to the pod receiver 300. For example, the pod receiver 300 may be round, e.g., circular, and the receptacle 270 may be generally circular (or may form a portion of a circle or other rounded shape when the pod receiver 300 is an other rounded shape) to enclose the pod receiver 300 within the receptacle 270. As illustrated for example in FIG. 15, the receptacle 270 may include a platform 272 which is complementary in shape to a bottom end of the pod receiver 300 and a perimetrical wall 274 which extends around at least a portion of the platform 272. As may be seen in FIGS. 14 and 15, a plurality of ribs 313 may be formed on the mold body 220 and may define one or more conduits or channels 314 between the ribs 313. Thus, the ribs 313 may extend into the receptacle 270 and underneath the pod receiver 300 (when the pod receiver 300 is mounted in the receptacle 270) to guide a flow of liquid water mixed with additive out from the bottom of the pod receiver 300 into one or more mold cavities 226 in the mold body 220. In embodiments where more than one mold cavity 226 is defined in the mold body 220, the mold cavities 226 may be separated and defined by a plurality of walls, and cross flow channels 228 may be defined in the walls between adjoining mold cavities 226, in order to promote even flow and distribution of the mixture of liquid water and additive throughout all of the mold cavities 226.

Figure 16:
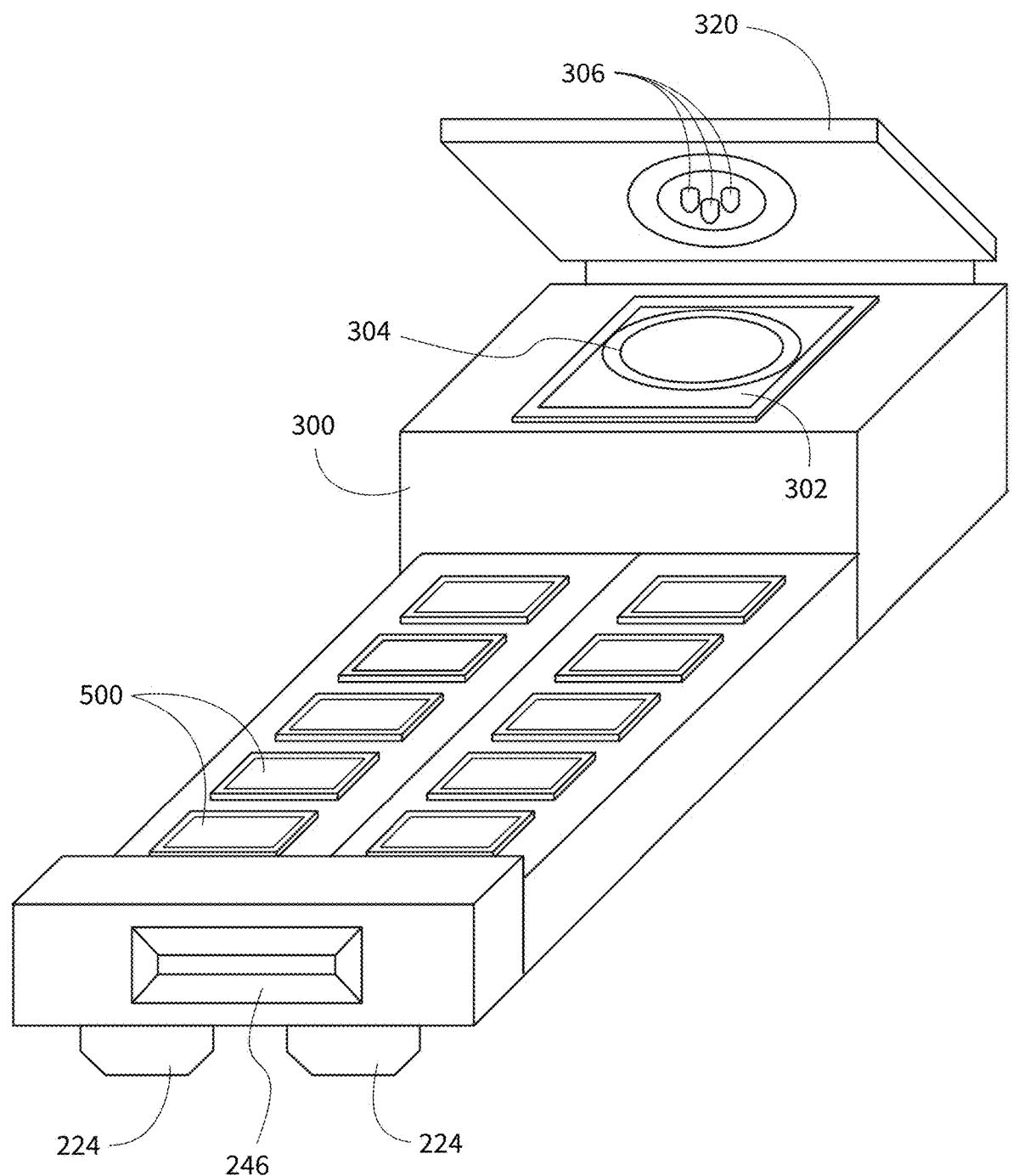
FIG. 16 provides a schematic illustration of an exemplary ice maker in accordance with one or more embodiments of the present disclosure with a door thereof in an open position.

In some embodiments, e.g., as illustrated in FIG. 16, the ice maker 200 may include two rows of compartments 224 in the mold body 220. Also as may be seen in FIG. 16, some embodiments may include more than one hollow needle 306 extending from the door 320. In various embodiments, the hollow needle 306 (or all of the hollow needles 306 when more than one hollow needle is provided) may be tapered, e.g., to form a nozzle which provides an increased pressure to the flow of liquid water. In embodiments where more than one hollow needle 306 is provided on the door 320, the hollow needles 306 may be oriented in different directions, e.g., to promote thorough flushing of the pod 304 with liquid water and mixing of the liquid water with additive within the pod 304.

Figure 17:
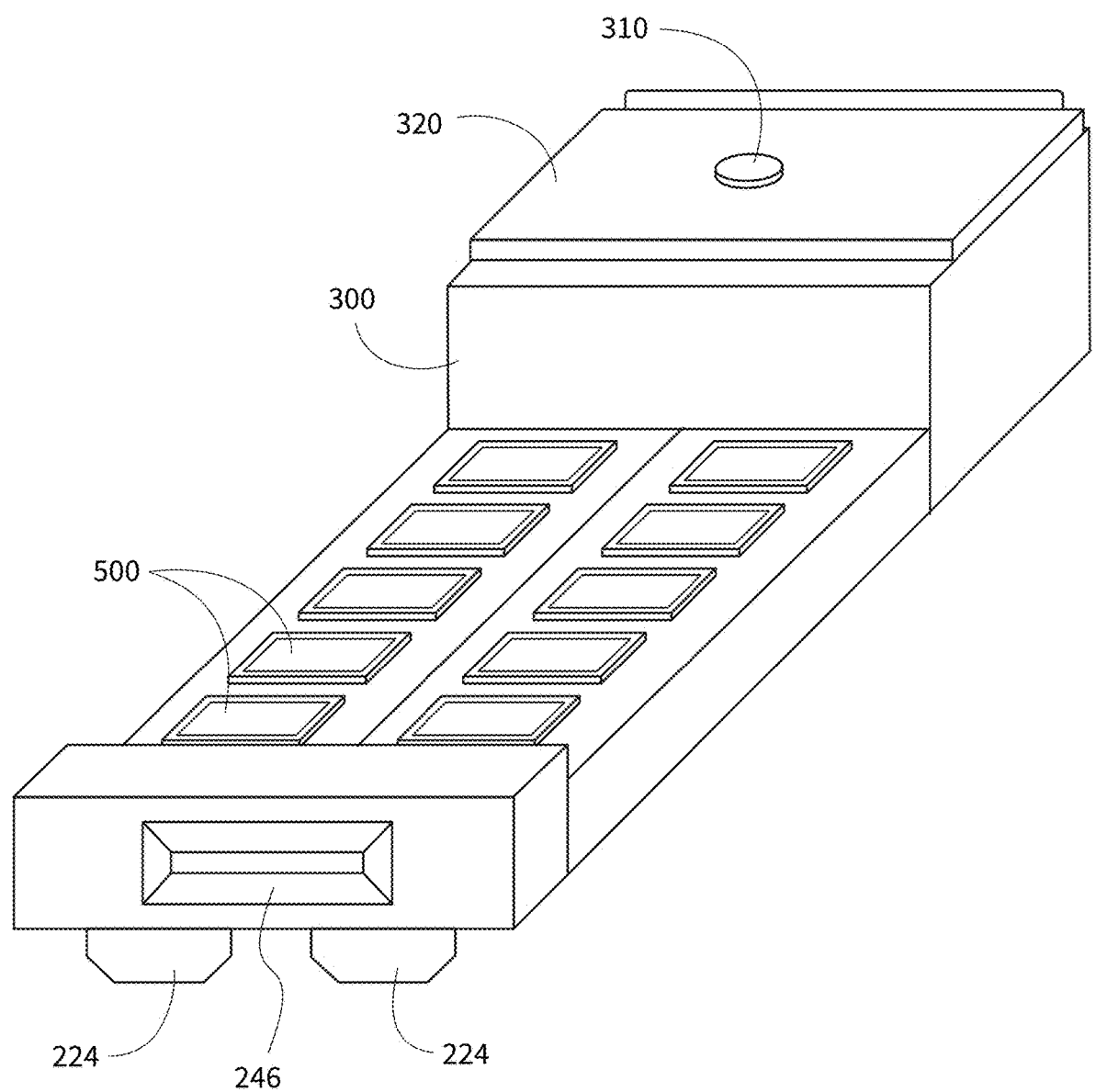
FIG. 17 provides a schematic illustration of the exemplary ice maker of FIG. 16 with the door thereof in a closed position.
Figure 18:
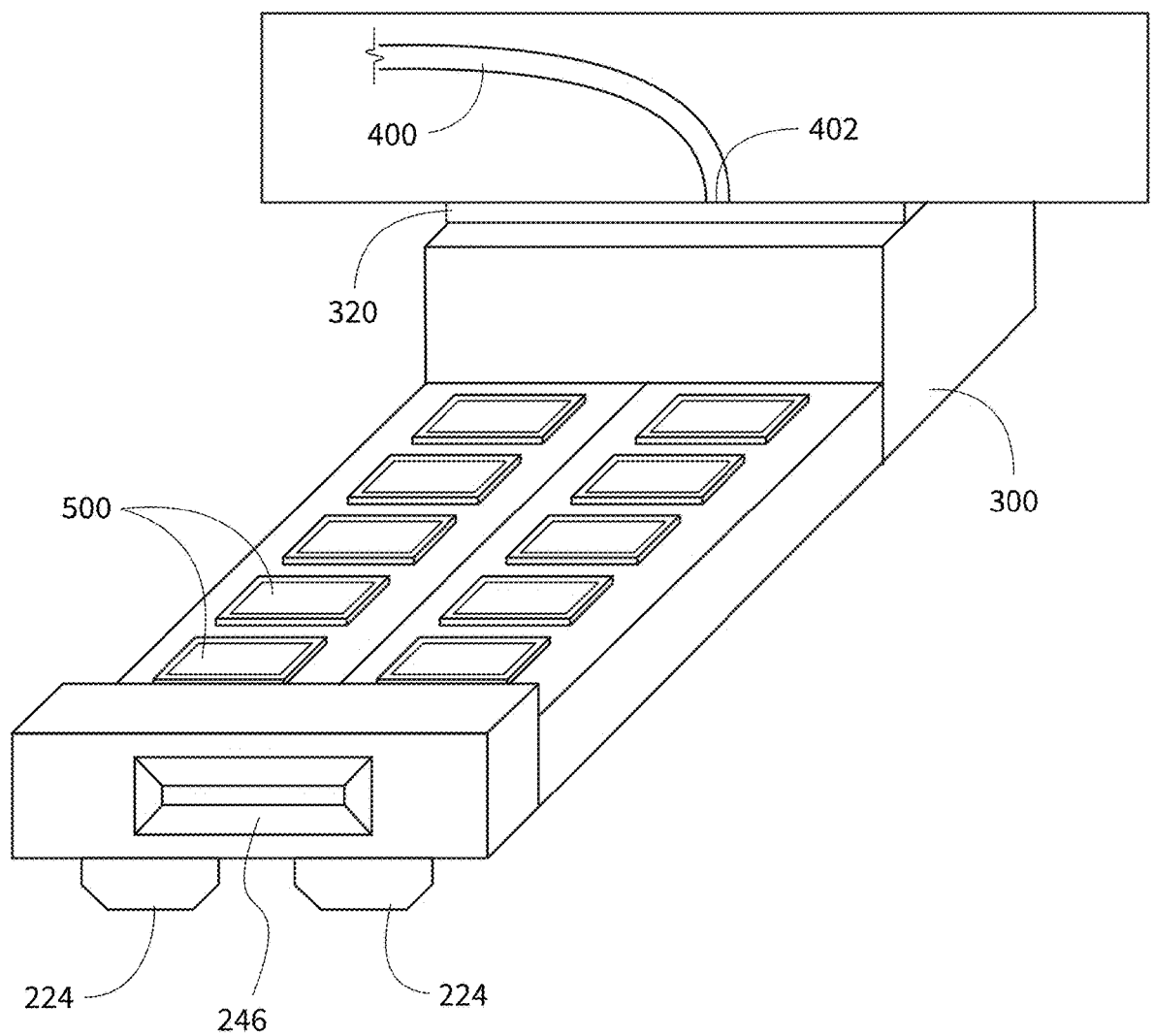
FIG. 18 provides a schematic illustration of the exemplary ice maker of FIG. 16 received in an exemplary refrigerator appliance in accordance with one or more embodiments of the present disclosure.

FIG. 17 illustrates the ice maker 200 with the door 320 in a closed position. When the door 320 moves from the open position (FIG. 16) to the closed position (FIG. 17) with the pod 304 positioned in the pod receiver slot 302, the hollow needle(s) 306 extending from the internal surface of the door 320 puncture the top of the pod 304. As may be seen in FIG. 17, the water inlet 310 may be provided at the top of pod receiver 300, e.g., the external surface of the door 320, which may also be the uppermost surface of the ice maker 200 overall. The water inlet 310 may be directly coupled to the hollow needle(s) 306 extending from the internal surface of the door 320 and in direct fluid communication with such hollow needle(s) 306, whereby liquid water flows directly from the water inlet 310 through the door 320 to the hollow needle(s) 306 that extend from the internal surface of the door 320 and into the pod 304 (after the pod has been punctured by the hollow needle(s) 306, e.g., as described). Thus, as may be seen in FIG. 18, when the ice maker 200 is installed in the ice maker appliance, e.g., refrigerator appliance 100, such as in freezer bin 134 described above with respect to FIGS. 12 and 13, water inlet 310 may be below and aligned with the outlet 402 of water supply line 400, to provide a flow of liquid water into and through the pod receiver 300 and the pod 304 therein.

Figure 19:
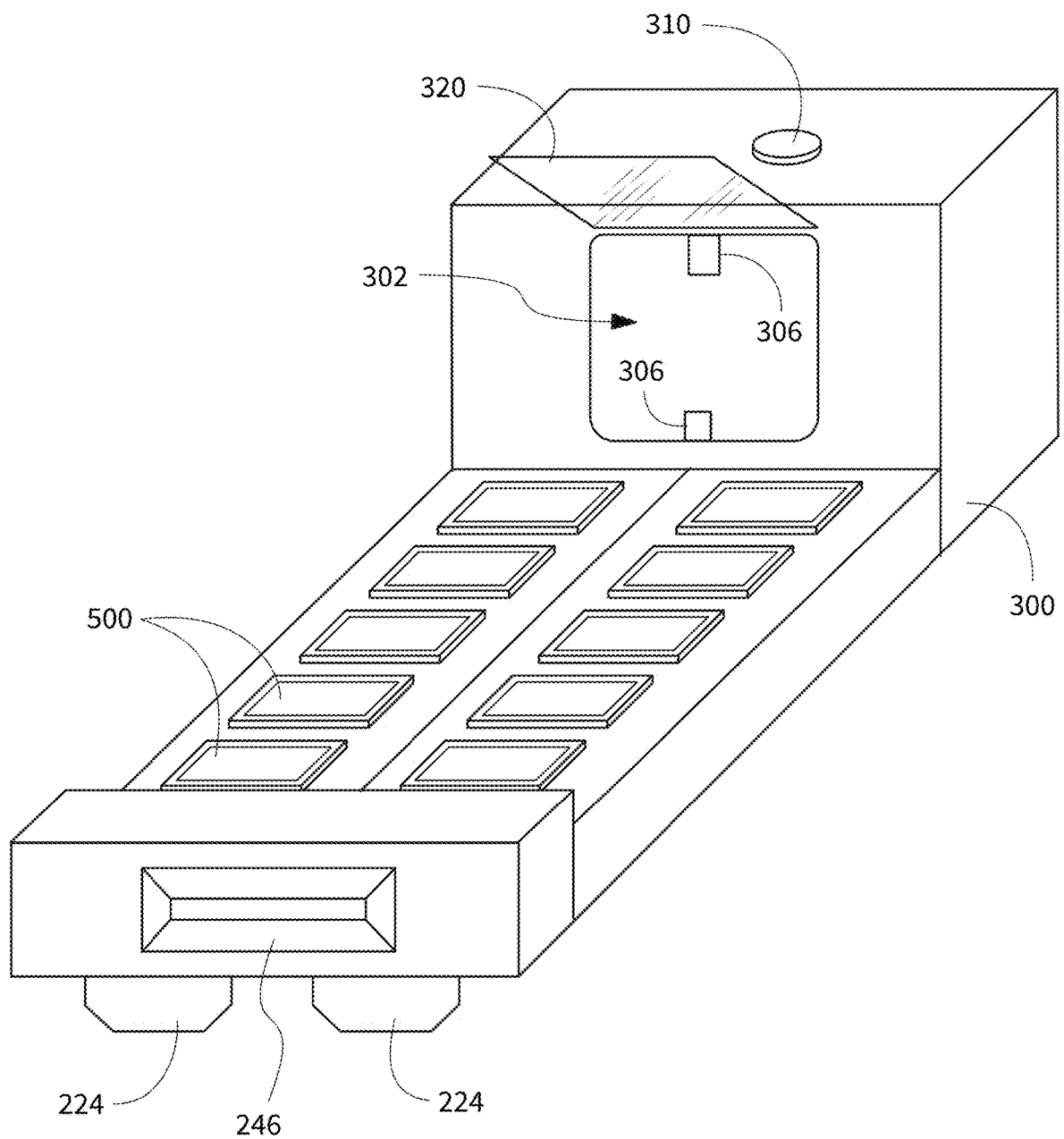
FIG. 19 provides a schematic illustration of an exemplary ice maker in accordance with one or more embodiments of the present disclosure with a door thereof in an open position.
Figure 20:
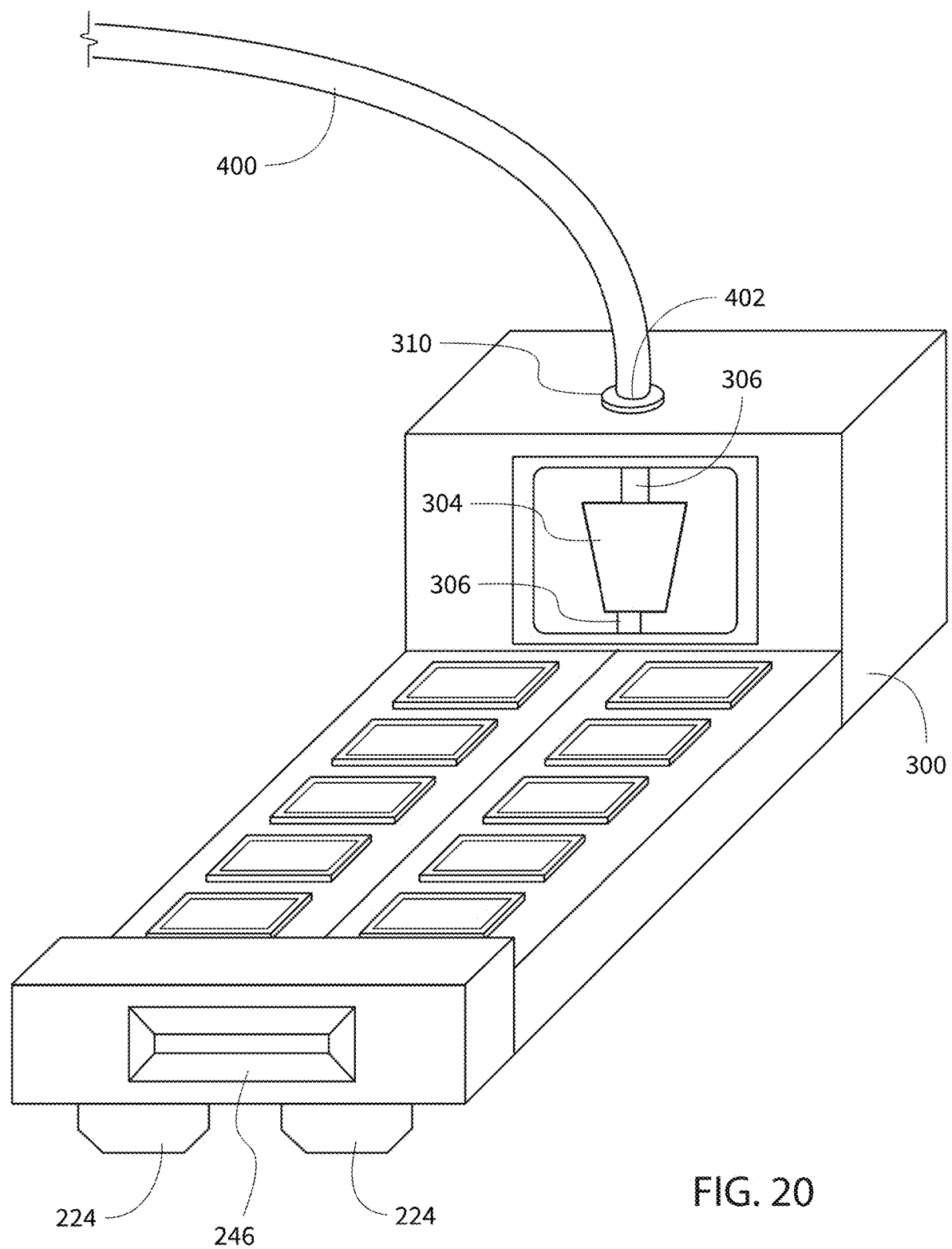
FIG. 20 provides a schematic illustration of the exemplary ice maker of FIG. 19 received in an exemplary refrigerator appliance in accordance with one or more embodiments of the present disclosure.

In some embodiments, e.g., as illustrated in FIGS. 19 and 20, the door 320 may be positioned on a surface of the pod receiver 300 other than the uppermost surface. For example, the door 320 may be located on a front surface of the pod receiver 300 as shown in FIG. 19, which may promote ease of access to the door 320, such as the door 320 may be opened to insert a pod 304 (FIG. 20) into the pod receiver slot 302 without having to remove the ice maker 200 from the ice maker appliance, e.g., refrigerator appliance 100. For example, such positioning of the door 320 may promote ease of access to the pod receiver slot 302, e.g., permitting adding or removing a pod 304 without having to take the mold body 220 and/or pod receiver 300 out of the ice maker appliance.

In embodiments where the door 320 is not on the top surface of the ice maker 200, the water inlet 310 may still be positioned on the top surface, as illustrated in FIGS. 19 and 20, such that the ice maker 200 may be aligned with the outlet 402 of the water supply line 400 in a similar manner as described above. Also, such embodiments may include hollow needles 306 within the pod receiver slot 302 for puncturing the pod 302 and flowing liquid water therethrough, where the upper hollow needle 306 is aligned with and coupled to the water inlet port 310 without being located on or extending from the door 320.

Figure 21:
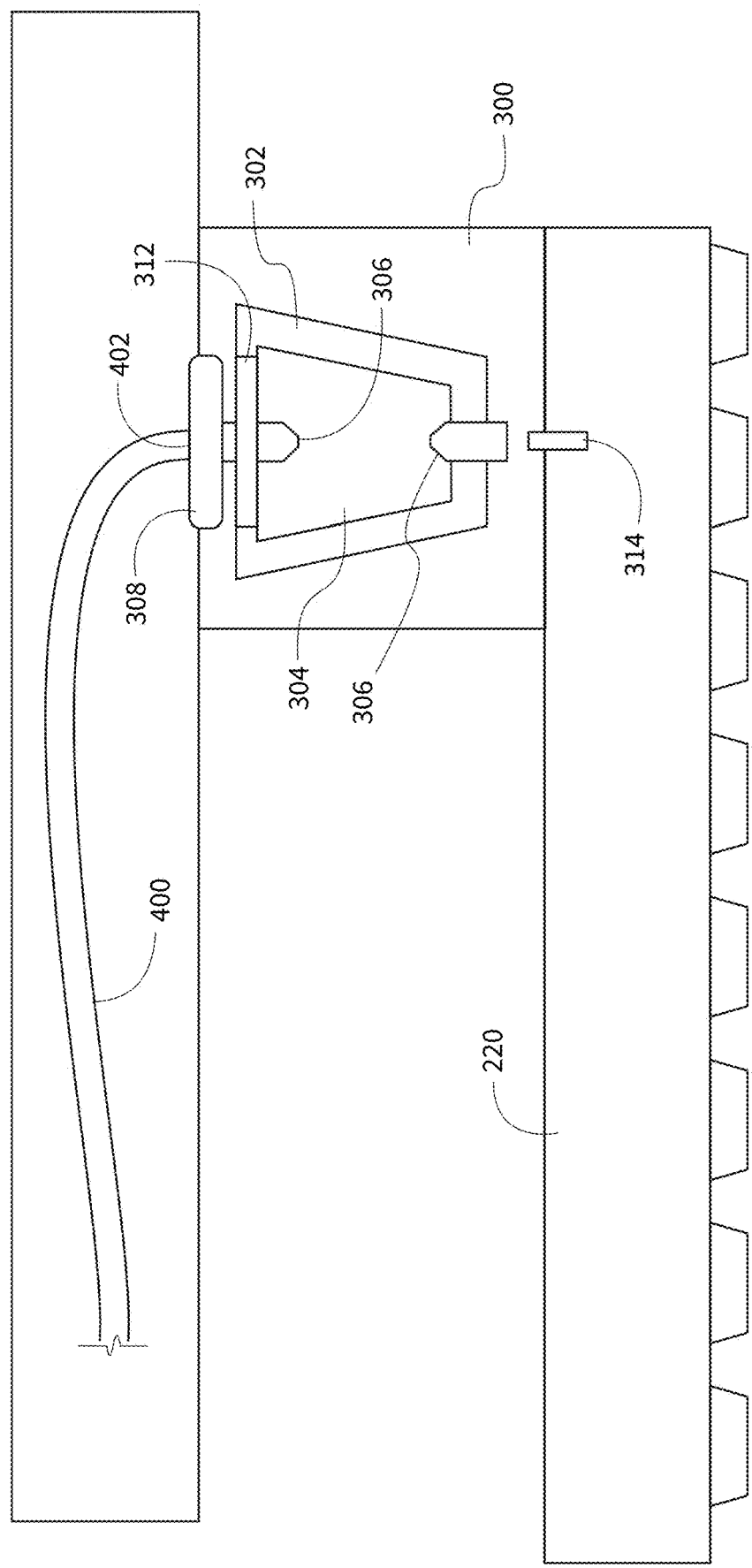
FIG. 21 provides a schematic illustration of an exemplary ice maker configured for pressurized flow in accordance with one or more exemplary embodiments of the present disclosure.
Figure 22:
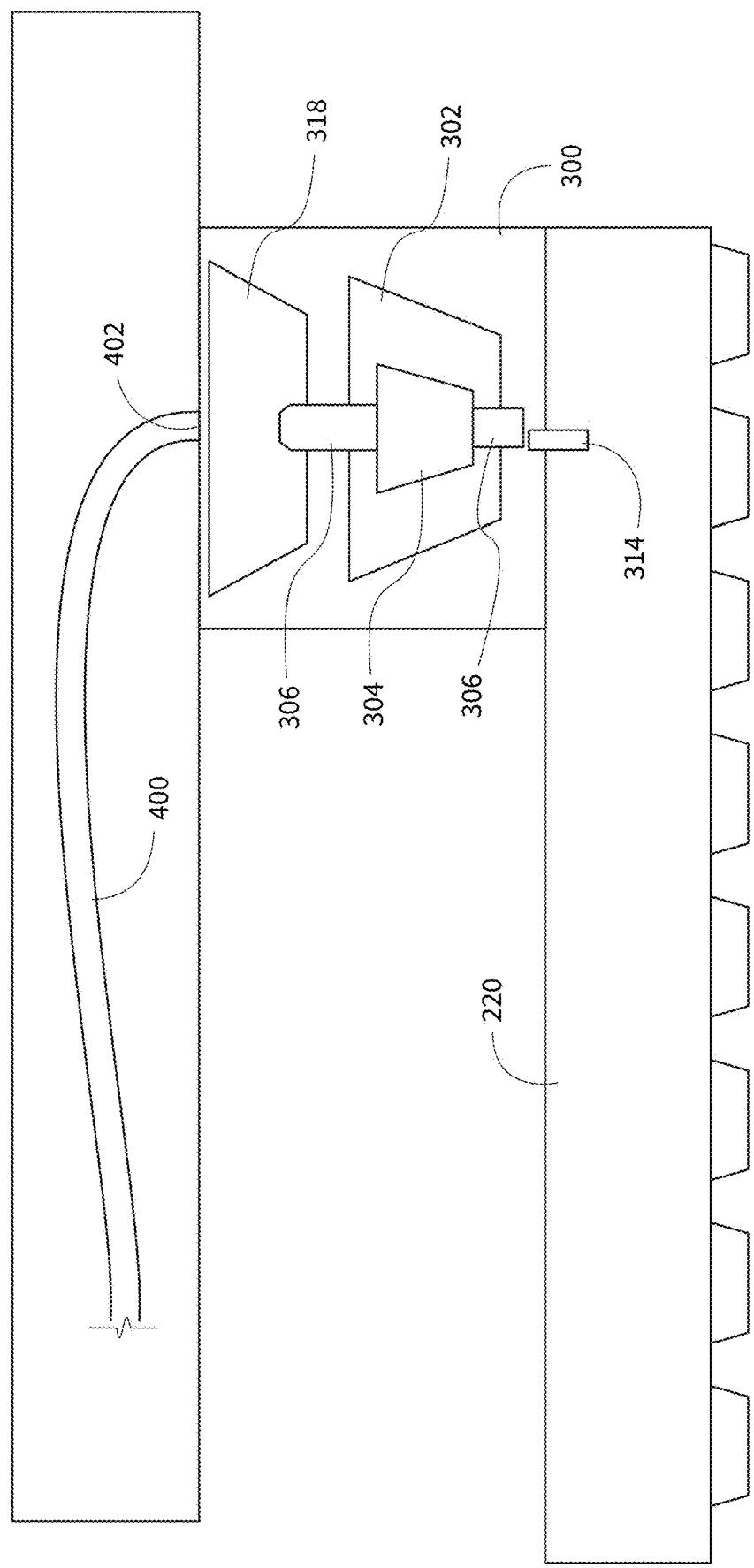
FIG. 22 provides a schematic illustration of an exemplary ice maker configured for gravity flow in accordance with one or more exemplary embodiments of the present disclosure.

In some embodiments, e.g., as illustrated in FIG. 21, the pod receiver 300 may be in direct fluid communication with the water supply line 400, such that the pod receiver 300 receives a pressurized flow of liquid water from the water supply line 400 directly and immediately from and through the one or more upper hollow needles 306, without flowing through any other intervening components. In additional embodiments, e.g., as illustrated in FIG. 22, a manifold 318 may be provided upstream of the pod receiver slot 302 along the flow path of the volume of liquid water, whereby liquid water flows from the manifold 318 to the pod receiver slot by gravity. For example, the liquid water may flow from the water supply line to the manifold 318, and the liquid water or a portion thereof may remain in the manifold 318 for a brief time until a sufficient height of liquid water within the manifold 318 is reached and the liquid water then flows down into the pod receiver by gravity. In embodiments where the manifold 318 is provided, the pod receiver slot 302 may be in indirect fluid communication with the water supply line 400 in that the liquid water from the outlet 402 of the water supply line 400 first flows through the manifold 318 between the water supply line 400 and the pod receiver slot 302 before reaching the pod receiver slot 302 and the pod 304 therein.

Figure 23:
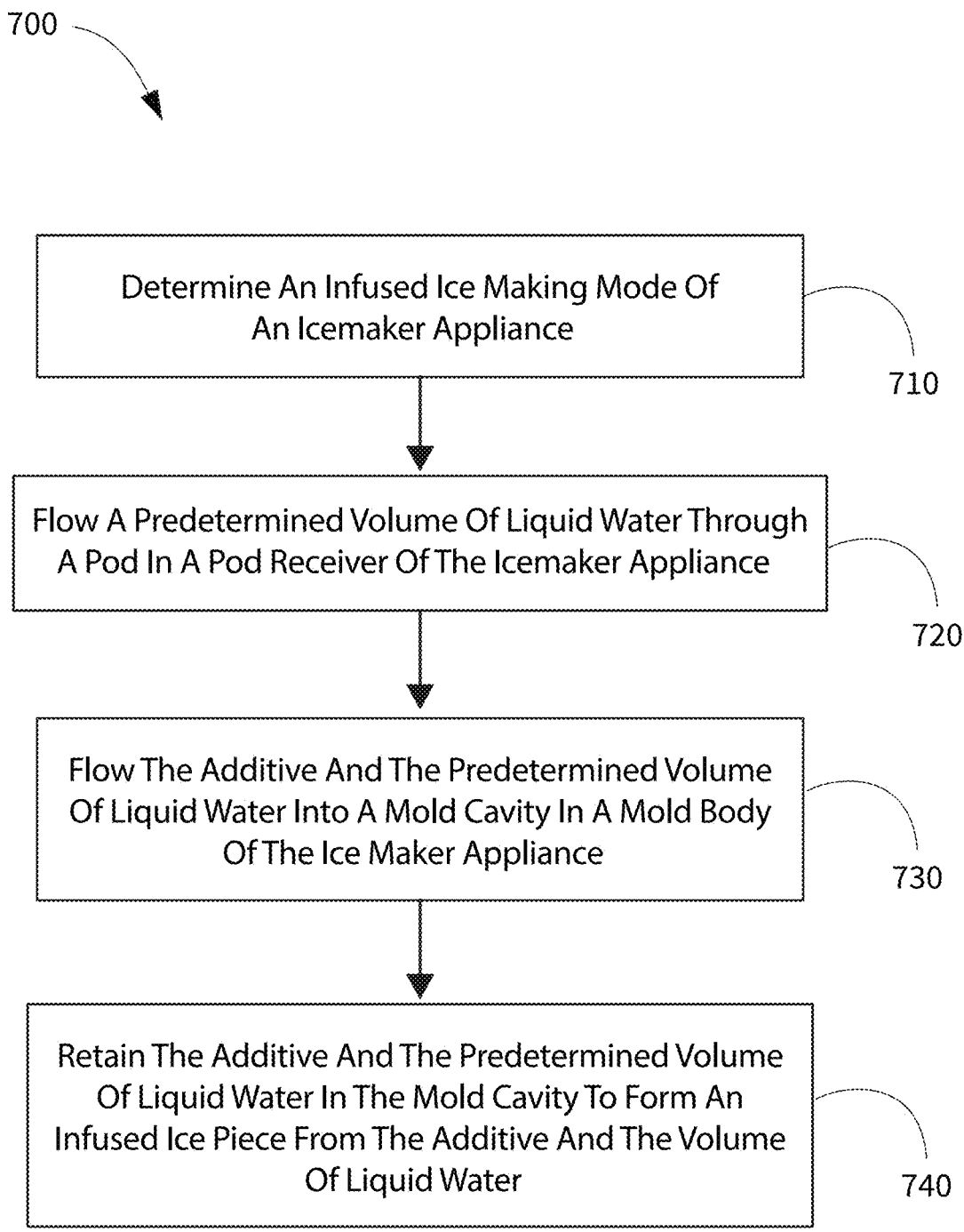
FIG. 23 provides an exemplary flow chart diagram of a method of operating an ice maker appliance according to one or more exemplary embodiments of the present disclosure.
Figure 24:
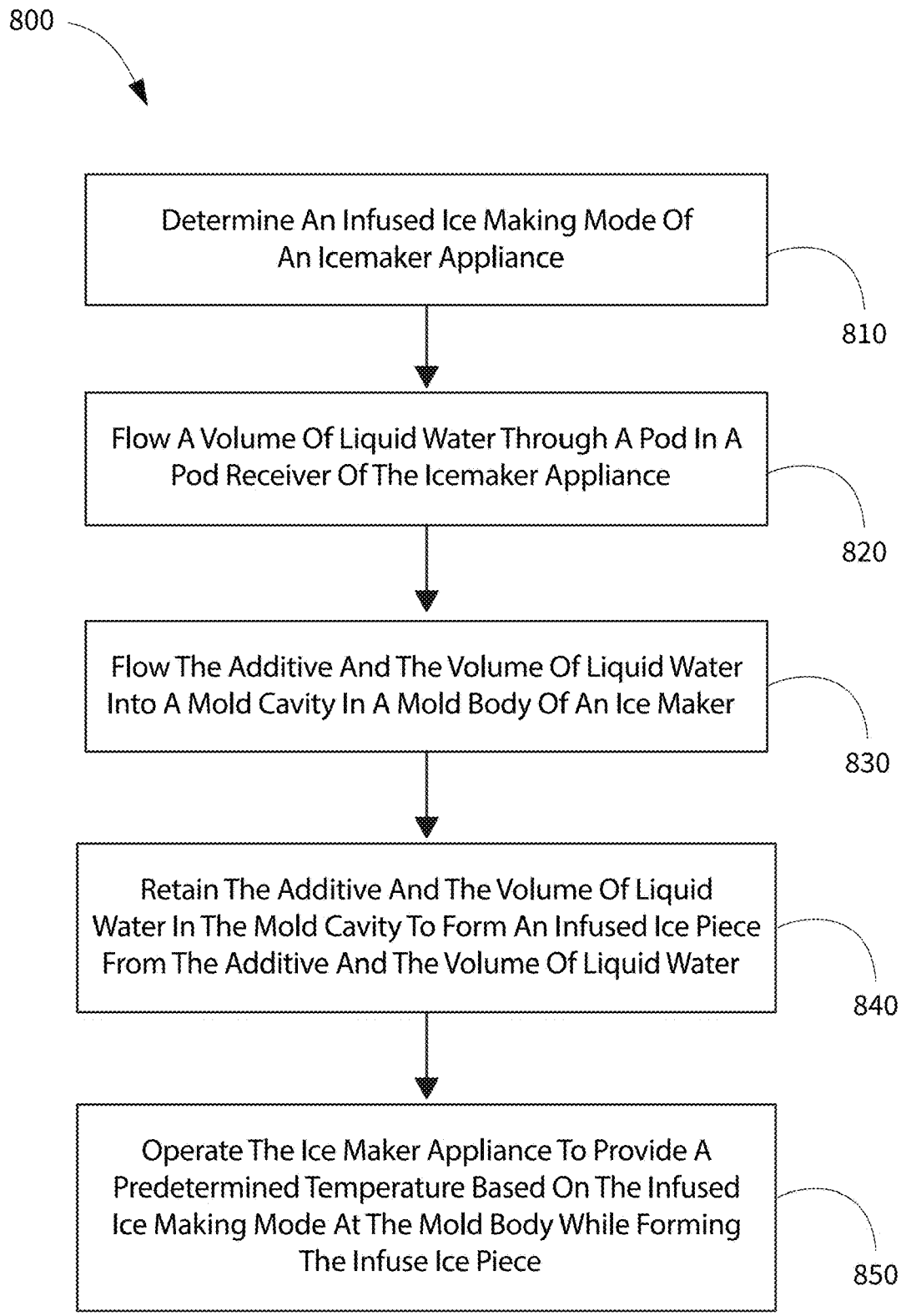
FIG. 24 provides an exemplary flow chart diagram of a method of operating an ice maker appliance according to one or more additional exemplary embodiments of the present disclosure.

Referring now to FIGS. 23 and 24, embodiments of the present disclosure also include methods of operating an ice maker appliance, such as methods which include selectively forming and/or producing plain ice comprising water only or infused ice comprising water and an additive, e.g., flavorant. It is to be understood that "water only" does not necessarily refer to pure water, but rather is intended to refer to water as received from a water source such as a plumbing system, well, municipal water supply, etc., whereby the "plain" water or "water only" generally includes various additional substances such as minerals, residual water treatment chemicals, etc., as may be found in typical potable water sources. FIG. 23 illustrates an exemplary method 700 of operating an ice maker appliance and FIG. 24 illustrates an exemplary method 800 of operating an ice maker appliance. Methods 700 and 800 may be used with a variety of ice maker appliances, such as the refrigerator appliance 100 described herein. For example, the ice maker appliance may include a mold body comprising a mold cavity and a pod receiver upstream of the mold cavity along a flow path of the volume of liquid water. The mold cavity may be configured for receiving a volume of liquid water therein and retaining the volume of liquid water to form an ice piece in the mold cavity, and the pod receiver may be configured to hold a pod containing an additive.

The accompanying FIGS., e.g., FIGS. 23 and 24, depict steps performed in a particular order for purpose of illustration and discussion. Those of ordinary skill in the art, using the disclosures provided herein, will understand that the steps of the methods 700 and/or 800 can be modified, adapted, rearranged, omitted, interchanged, or expanded in various ways without deviating from the scope of the present disclosure. Referring generally to FIGS. 23 and 24, the methods 700 and 800 may be interrelated and/or may have one or more steps from one of the methods 700 and 800 combined with one or more other method(s) 700 or 800. Thus, those of ordinary skill in the art will recognize that the various steps of the exemplary methods described herein may be combined in various ways to arrive at additional embodiments within the scope of the present disclosure. Those of ordinary skill in the art, using the disclosures provided herein, will understand that (except as otherwise indicated) methods 700 and 800 are not mutually exclusive. Moreover, the steps of the methods 700 and 800 can be modified, adapted, rearranged, omitted, interchanged, or expanded in various ways without deviating from the scope of the present disclosure.

As shown in FIG. 23, method 700 may include (710) determining an infused ice making mode of the ice maker appliance. The infused ice making mode may include forming an infused ice piece from the liquid water and the additive. Method 700 may further include (720) flowing a predetermined volume of liquid water through the pod in the pod receiver, which may result in the additive mixing with the predetermined volume of liquid water. The predetermined volume of liquid water may be based on the infused ice making mode. For example, the volume of liquid water based on the infused ice making mode may be less than a volume of liquid water provided in a standard or plain ice making mode, e.g., the predetermined volume of liquid water based on the infused ice making mode may be less than a default volume of liquid water for making water ice, such as due to the volume of the additive which is also included (mixed into the liquid water) in the infused ice making mode. Method 700 may also include (730) flowing the additive and the predetermined volume of liquid water into the mold cavity and (740) retaining the additive and the predetermined volume of liquid water in the mold cavity to form the infused ice piece from the additive and the volume of liquid water.

As shown in FIG. 24, method 800 may include (810) determining an infused ice making mode of the ice maker appliance. The infused ice making mode may include forming an infused ice piece from the liquid water and the additive. Method 800 may further include (820) flowing a volume of liquid water through the pod in the pod receiver, which may result in the additive mixing with the volume of liquid water. Method 800 may also include (830) flowing the additive and the volume of liquid water into the mold cavity and (840) retaining the additive and the volume of liquid water in the mold cavity to form the infused ice piece from the additive and the volume of liquid water. Method 800 may further include (850) operating the ice maker appliance to provide a predetermined temperature at the mold body while retaining the additive and the volume of liquid water in the mold cavity to form the infused ice piece from the additive and the volume of liquid water. The predetermined temperature at the mold body may be based on the infused ice making mode. For example, the predetermined temperature based on the infused ice making mode may be lower than a standard or plain (water only) ice making mode, such as due to the mixture of liquid water and additive having a lower freezing point than plain water, e.g., the predetermined temperature at the mold body based on the infused ice making mode may be lower than a default temperature at the mold body for making water ice.

In some embodiments, methods according to the present disclosure, e.g., method 700 and/or 800, may include operating the ice maker appliance to provide a predetermined freeze time while retaining the additive and the volume of liquid water, e.g., predetermined volume of liquid water, in the mold cavity to form the infused ice piece from the additive and the volume of liquid water. In such embodiments, the predetermined freeze time may be based on the infused ice making mode. For example, the freeze time for making infused ice may be longer than a freeze time for making plain ice, such as the mixture of liquid water and additive may take longer to freeze than water alone. Thus, for example, the predetermined freeze time for the infused ice making mode may be longer than a default freeze time for making water ice. Such embodiments may further include harvesting the infused ice piece from the mold cavity after the predetermined freeze time. For example, the infused ice piece may be automatically harvested, e.g., by twisting a twist tray which may be an embodiment of the mold body.

As noted above, methods 700 and 800 may be intermixed, such as method 700 may also include operating the ice maker appliance to provide a predetermined temperature at the mold body while retaining the additive and the predetermined volume of liquid water in the mold cavity to form the infused ice piece from the additive and the volume of liquid water, wherein the predetermined temperature at the mold body is based on the infused ice making mode. As another example, in some embodiments of method 800 the volume of liquid water at (820) may be a predetermined volume based on the infused ice making mode, and the predetermined volume of liquid water may be less than a default volume of liquid water for making water ice.

In some embodiments where methods according to the present disclosure, e.g., method 700 and/or 800, include operating the ice maker appliance to provide the predetermined temperature at the mold body, the predetermined temperature may be provided by at least one of rotating a fan of the ice maker appliance at a first speed prior to the infused ice making mode followed by rotating the fan at a second speed greater than the first speed during the infused ice making mode; and operating a compressor of a sealed cooling system of the ice maker appliance at a first speed prior to the infused ice making mode followed by operating the compressor at a second speed greater than the first speed during the infused ice making mode.

In some embodiments, the infused ice making mode may be determined by detecting the pod in the pod receiver. For example, the ice maker appliance may include one or more sensors, such as an RFID sensor or Hall effect sensor, etc., as described above, such that the ice maker appliance may be configured to detect the pod in the pod receiver based on a signal from the sensor(s). Thus, in such embodiments, the infused ice making mode may be automatically determined.

In additional embodiments, the infused ice making mode may be manually determined. For example, the infused ice making mode may be determined in response to a user input comprising an infused ice mode selection. The selection may be received, for example, from a user input device such as inputs 162 and/or from a remote user interface device, e.g., smartphone or other similar device in wireless communication with the ice maker appliance. In some embodiments, the infused ice making mode may also be verified by sensing the pod in the pod receiver after and in response to the infused ice making mode selection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an ice maker appliance, the ice maker appliance comprising a mold body comprising a mold cavity, the mold cavity configured for receiving liquid water therein and retaining the liquid water to form an ice piece in the mold cavity, and a pod receiver upstream of the mold cavity along a flow path of the liquid water, the pod receiver configured to hold a pod containing an additive, the method comprising:
   determining an infused ice making mode of the ice maker appliance, the infused ice making mode comprising forming an infused ice piece from the liquid water and the additive;
   flowing a predetermined volume of liquid water through the pod in the pod receiver, whereby the additive mixes with the predetermined volume of liquid water, the predetermined volume of liquid water based on the infused ice making mode;
   flowing the additive and the predetermined volume of liquid water into the mold cavity; and
   retaining the additive and the predetermined volume of liquid water in the mold cavity to form the infused ice piece from the additive and the volume of liquid water.

2. The method of claim 1, further comprising operating the ice maker appliance to provide a predetermined freeze time while retaining the additive and the predetermined volume of liquid water in the mold cavity to form the infused ice piece from the additive and the volume of liquid water, wherein the predetermined freeze time is based on the infused ice making mode.

3. The method of claim 2, further comprising harvesting the infused ice piece from the mold cavity after the predetermined freeze time.

4. The method of claim 2, wherein the predetermined freeze time for the infused ice making mode is longer than a default freeze time for making water ice.

5. The method of claim 1, further comprising operating the ice maker appliance to provide a predetermined temperature at the mold body while retaining the additive and the predetermined volume of liquid water in the mold cavity to form the infused ice piece from the additive and the volume of liquid water, wherein the predetermined temperature at the mold body is based on the infused ice making mode.

6. The method of claim 5, wherein operating the ice maker appliance to provide the predetermined temperature at the mold body comprises at least one of: rotating a fan of the ice maker appliance at a first speed prior to the infused ice making mode followed by rotating the fan at a second speed greater than the first speed during the infused ice making mode; and operating a compressor of a sealed cooling system of the ice maker appliance at a first speed prior to the infused ice making mode followed by operating the compressor at a second speed greater than the first speed during the infused ice making mode.

7. The method of claim 5, wherein the predetermined temperature at the mold body based on the infused ice making mode is lower than a default temperature at the mold body for making water ice.

8. The method of claim 1, wherein the predetermined volume of liquid water based on the infused ice making mode is less than a default volume of liquid water for making water ice.

9. The method of claim 1, wherein the infused ice making mode is determined by detecting the pod in the pod receiver.

10. The method of claim 1, wherein the infused ice making mode is determined in response to a user input comprising an infused ice mode selection.

11. A method of operating an ice maker appliance, the ice maker appliance comprising a mold body comprising a mold cavity, the mold cavity configured for receiving liquid water therein and retaining the liquid water to form an ice piece in the mold cavity, and a pod receiver upstream of the mold cavity along a flow path of the liquid water, the pod receiver configured to hold a pod containing an additive, the method comprising:
  determining an infused ice making mode of the ice maker appliance, the infused ice making mode comprising forming an infused ice piece from the liquid water and the additive;
  flowing a volume of liquid water through the pod in the pod receiver, whereby the additive mixes with the volume of liquid water;
  flowing the additive and the volume of liquid water into the mold cavity;
  retaining the additive and the volume of liquid water in the mold cavity to form the infused ice piece from the additive and the volume of liquid water; and
  operating the ice maker appliance to provide a predetermined temperature at the mold body while retaining the additive and the volume of liquid water in the mold cavity to form the infused ice piece from the additive and the volume of liquid water, wherein the predetermined temperature at the mold body is based on the infused ice making mode.

12. The method of claim 11, wherein operating the ice maker appliance to provide the predetermined temperature at the mold body comprises at least one of: rotating a fan of the ice maker appliance at a first speed prior to the infused ice making mode followed by rotating the fan at a second speed greater than the first speed during the infused ice making mode; and operating a compressor of a sealed cooling system of the ice maker appliance at a first speed prior to the infused ice making mode followed by operating the compressor at a second speed greater than the first speed during the infused ice making mode.

13. The method of claim 11, wherein the predetermined temperature at the mold body based on the infused ice making mode is lower than a default temperature at the mold body for making water ice.

14. The method of claim 11, wherein the volume of liquid water is a predetermined volume based on the infused ice making mode, wherein the predetermined volume of liquid water based on the infused ice making mode is less than a default volume of liquid water for making water ice.

15. The method of claim 11, further comprising operating the ice maker appliance to provide a predetermined freeze time while retaining the additive and the volume of liquid water in the mold cavity to form the ice piece from the additive and the volume of liquid water, wherein the predetermined freeze time is based on the infused ice making mode.

16. The method of claim 15, further comprising harvesting the ice piece from the mold cavity after the predetermined freeze time.

17. The method of claim 15, wherein the predetermined freeze time for the infused ice making mode is longer than a default freeze time for making water ice.

18. The method of claim 11, wherein the infused ice making mode is determined by detecting the pod in the pod receiver.

19. The method of claim 11, wherein the infused ice making mode is determined in response to a user input comprising an infused ice mode selection.

* * * * *